US012777045B2

(12) United States Patent
Regmi et al.

(10) Patent No.: US 12,777,045 B2
(45) Date of Patent: Oct. 27, 2026

(54) SYSTEMS AND METHODS FOR NODE-BASED NETWORK ACCESS CONTROL

(71) Applicant: Wells Fargo Bank, N.A., San Francisco, CA (US)

(72) Inventors: Ashmita Regmi, San Francisco, CA (US); Ian T. Staley, San Francisco, CA (US); Anita Sukur, Minneapolis, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 29 days.

(21) Appl. No.: 19/076,659

(22) Filed: Mar. 11, 2025

(65) Prior Publication Data

US 2026/0281122 A1 Sep. 17, 2026

(51) Int. Cl.

| | |
|---|---|
| ***G06F 21/64*** | (2013.01) |
| ***H04L 9/40*** | (2022.01) |
| ***H04L 67/306*** | (2022.01) |
| *G06F 21/71* | (2013.01) |
| *G06F 21/78* | (2013.01) |
| *H04L 67/303* | (2022.01) |

(52) U.S. Cl.
CPC ............ *H04L 63/108* (2013.01); *H04L 63/20* (2013.01)

(58) Field of Classification Search
None
See application file for complete search history.

(56) References Cited

U.S. PATENT DOCUMENTS

2021/0073913 A1* 3/2021 Ingargiola ............... H04L 63/12
2024/0193593 A1* 6/2024 Zheng ........................ H04L 9/50
2025/0200682 A1* 6/2025 Barlow, Jr. ............ G06Q 50/18
2025/0293884 A1* 9/2025 Gilchrist ............... G06F 3/0655

FOREIGN PATENT DOCUMENTS

KR 102067882 B1 * 2/2020 ............. G06F 21/30
WO WO-2022226202 A1 * 10/2022 ........... H04L 63/105

* cited by examiner

*Primary Examiner* — Venkat Perungavoor
(74) *Attorney, Agent, or Firm* — Foley & Lardner LLP

(57) ABSTRACT

Systems, methods, and computer readable media for node-based network access control. A system can include one or more processors to receive a network access request including metadata corresponding with accessing a protected network using a computing device. The one or more processors apply the metadata to a node model to generate a first node. The one or more processors generate a metadata object, generate a control structure, and record the control structure. The one or more processors generate a token including a token identifier, the token corresponding with the metadata object and compatible with the control structure. The one or more processors record the token identifier and receive an output or update request. The one or more processors access, by interfacing with the control structure, the metadata object, determine network access rights or restrictions, and provide or restrict access of the computing device to the protected network.

20 Claims, 6 Drawing Sheets

SYSTEMS AND METHODS FOR NODE-BASED NETWORK ACCESS CONTROL

BACKGROUND

The present disclosure relates generally to network security, and more particularly to regulating access to data and/or services. In a computer networked environment such as the internet, systems or services can authenticate entities such as people or companies to exchange information or resources.

SUMMARY

Some implementations relate to a system, including a data processing system including memory and one or more processors. The one or more processors can be configured to receive, from at least one computing device, a network access request including metadata corresponding with the at least one computing device, the network access request corresponding with accessing a protected network using the at least one computing device. The one or more processors can be configured to apply the metadata to a node model to cause the node model to generate a first node. The one or more processors can be configured to generate a metadata object including the metadata, wherein the metadata object includes one or more access parameters. The one or more processors can be configured to generate a control structure including a link to the metadata object. The one or more processors can be configured to record, on a ledger, the control structure. The one or more processors can be configured to generate, using the control structure, at least one token including a token identifier and corresponding with the metadata object, the at least one token compatible with the control structure restricting outputs or updates of the metadata object. The one or more processors can be configured to record, on the ledger, the token identifier. The one or more processors can be configured to receive, from the at least one computing device, an output or update request including the first node and at least one request parameter. The one or more processors can be configured to access, by interfacing with the control structure on the ledger, the metadata object by retrieving a metadata reference corresponding with the at least one token from the control structure and using the metadata reference to obtain the metadata object from an external storage system. The one or more processors can be configured to determine one or more network access rights or restrictions of the at least one computing device on the protected network using at least one of the one or more access parameters and the at least one request parameter. The one or more processors can be configured to provide or restrict access of the at least one computing device to one or more functions or resources of the protected network based on the one or more network access rights or restrictions.

In some implementations, the one or more processors can be configured to store the first node in a graph storage, the graph storage including a plurality of secondary nodes linked with a plurality of primary nodes by a plurality of edges representing relationships between the plurality of secondary nodes and the plurality of primary nodes, and link, in the graph storage, the first node with a primary node of the plurality of primary nodes, the primary node corresponding with of a user of the at least one computing device, wherein the first node is one of the plurality of secondary nodes, wherein determining the one or more network access rights or restrictions includes accessing the graph storage and retrieving metadata of the primary node.

In some implementations, accessing the graph storage and retrieving metadata of the primary node includes identifying at least one edge of the plurality of edges linking the first node to the primary node, the at least one edge representing a relationship between the first node and the primary node, traversing the graph storage by using the at least one edge to access the metadata of the primary node, and determining, based on the metadata of the primary node, at least one access parameter corresponding with the first node.

In some implementations, determining the one or more network access rights or restrictions includes identifying at least one data structure of the protected network corresponding to the first node, determining at least one attribute or parameter of the at least one data structure corresponding to the output or update request, comparing the at least one attribute or parameter of the at least one data structure to the at least one request parameter, and in response to comparing the at least one attribute or parameter to the at least one request parameter, providing or restricting the access of the at least one computing device to one or more functions or resources of the protected network.

In some implementations, the one or more processors can be configured to generate, based on comparing the at least one attribute or parameter to the at least one data structure, at least one of a confirmation or status alert corresponding with the at least one computing device accessing the protected network, and provide the at least one of the confirmation or status alert to a graphical user interface of the at least one computing device.

In some implementations, the one or more access parameters of the metadata object include at least one access context parameter including one or more conditions for permitting the at least one computing device to request access to the protected network, the at least one access context parameter including at least one of a geographic location of the at least one computing device, a temporal access interval corresponding with the network access request, or a compliance status indicating an association of the first node with a second node of the protected network, the second node corresponding with a private data of the at least one computing device.

In some implementations, generating the at least one token includes verifying the network access request based on an authentication event using authentication data of the at least one computing device, generating a public-private key pair for the first node, the public-private key pair including a public key and a private key, generating a digital signature for the at least one token using the private key, and recording the public key on the ledger.

In some implementations, verifying the network access request includes identifying at least one authentication factor of the authentication data, the at least one authentication factor including at least one of a cryptographic key or identifier of the at least one computing device or biometric authentication data corresponding with a user of the at least one computing device.

In some implementations, the one or more processors can be configured to receive a revocation request including updated network access rights or restrictions of the at least one computing device, update at least one of the one or more access parameters of the metadata object to indicate a restricted network access status for the at least one computing device, and update, based on determining the revocation request satisfies a predefined revocation condition corresponding the updated network access rights or restrictions, the control structure of the first node to prevent the outputs or updates of the metadata object.

In some implementations, the at least one request parameter corresponding with one or more functions or resources of the protected network, and wherein providing or restricting the access to the one or more functions or resources includes performing at least one network operation corresponding with the one or more functions or resource, wherein the at least one network operation includes at least one of (i) retrieving or updating data corresponding to the first node or (ii) transmitting a request to initiate a resource transfer over the protected network, or applying, based on the metadata object, at least one condition restricting execution of the at least one network operation.

In some implementations, the metadata includes at least one device attribute of the at least one computing device applied to the node model to generate the first node, wherein the external storage system includes a wallet system of a user of the at least one computing device, and the one or more processors can be configured to retrieve the metadata object from the wallet system in response to the output or update request using the metadata reference.

Some implementations relate to a method, including receiving, by one or more processors, from at least one computing device, a network access request including metadata corresponding with the at least one computing device, the network access request corresponding with accessing a protected network using the at least one computing device. The method further includes applying, by the one or more processors, the metadata to a node model to cause the node model to generate a first node. The method further includes generating, by the one or more processors, a metadata object including the metadata, wherein the metadata object includes one or more access parameters. The method further includes generating, by the one or more processors, a control structure including a link to the metadata object. The method further includes recording, by the one or more processors, on a ledger, the control structure. The method further includes generating, by the one or more processors, using the control structure, at least one token including a token identifier and corresponding with the metadata object, the at least one token compatible with the control structure restricting outputs or updates of the metadata object. The method further includes recording, by the one or more processors, on the ledger, the token identifier. The method further includes receiving, by the one or more processors, from the at least one computing device, an output or update request including the first node and at least one request parameter. The method further includes accessing, by the one or more processors, by interfacing with the control structure on the ledger, the metadata object by retrieving a metadata reference corresponding with the at least one token from the control structure and using the metadata reference to obtain the metadata object from an external storage system. The method further includes determining, by the one or more processors, one or more network access rights or restrictions of the at least one computing device on the protected network using at least one of the one or more access parameters and the at least one request parameter. The method further includes providing or restricting, by the one or more processors, access of the at least one computing device to one or more functions or resources of the protected network based on the one or more network access rights or restrictions.

In some implementations, the method further includes storing, by the one or more processors, the first node in a graph storage, the graph storage including a plurality of secondary nodes linked with a plurality of primary nodes by a plurality of edges representing relationships between the plurality of secondary nodes and the plurality of primary nodes, and linking, by the one or more processors, in the graph storage, the first node with a primary node of the plurality of primary nodes, the primary node corresponding with of a user of the at least one computing device, wherein the first node is one of the plurality of secondary nodes, wherein determining the one or more network access rights or restrictions includes accessing the graph storage and retrieving metadata of the primary node.

In some implementations, accessing the graph storage and retrieving metadata of the primary node includes identifying, by the one or more processors, at least one edge of the plurality of edges linking the first node to the primary node, the at least one edge representing a relationship between the first node and the primary node, traversing, by the one or more processors, the graph storage by using the at least one edge to access the metadata of the primary node, and determining, by the one or more processors, based on the metadata of the primary node, at least one access parameter corresponding with the first node.

In some implementations, determining the one or more network access rights or restrictions includes identifying, by the one or more processors, at least one data structure of the protected network corresponding to the first node, determining, by the one or more processors, at least one attribute or parameter of the at least one data structure corresponding to the output or update request, comparing, by the one or more processors, the at least one attribute or parameter of the at least one data structure to the at least one request parameter, and, in response to comparing the at least one attribute or parameter to the at least one request parameter, providing or restricting, by the one or more processors, the access of the at least one computing device to one or more functions or resources of the protected network.

In some implementations, the method further includes generating, by the one or more processors, based on comparing the at least one attribute or parameter to the at least one data structure, at least one of a confirmation or status alert corresponding with the at least one computing device accessing the protected network, and providing, by the one or more processors, the at least one of the confirmation or status alert to a graphical user interface of the at least one computing device.

In some implementations, the one or more access parameters of the metadata object include at least one access context parameter including one or more conditions for permitting the at least one computing device to request access to the protected network, the at least one access context parameter including at least one of a geographic location of the at least one computing device, a temporal access interval corresponding with the network access request, or a compliance status indicating an association of the first node with a second node of the protected network, the second node corresponding with a private data of the at least one computing device.

In some implementations, generating the at least one token includes verifying the network access request based on an authentication event using authentication data of the at least one computing device, generating a public-private key pair for the first node, the public-private key pair including a public key and a private key, generating a digital signature for the at least one token using the private key, and recording the public key on the ledger.

In some implementations, verifying the network access request includes identifying at least one authentication factor of the authentication data, the at least one authentication factor including at least one of a cryptographic key or identifier of the at least one computing device or biometric authentication data corresponding with a user of the at least one computing device.

Some implementations relate to a non-transitory computer readable medium (CRM) including one or more instructions stored thereon that, when executed by one or more processors, cause the one or more processors to perform operations including receiving, from at least one computing device, a network access request including metadata corresponding with the at least one computing device, the network access request corresponding with accessing a protected network using the at least one computing device, applying the metadata to a node model to cause the node model to generate a first node, generating a metadata object including the metadata, wherein the metadata object includes one or more access parameters, generating a control structure including a link to the metadata object, recording, on a ledger, the control structure, generating, using the control structure, at least one token including a token identifier and corresponding with the metadata object, the at least one token compatible with the control structure restricting outputs or updates of the metadata object, recording, on the ledger, the token identifier, receiving, from the at least one computing device, an output or update request including the first node and at least one request parameter, accessing, by interfacing with the control structure on the ledger, the metadata object by retrieving a metadata reference corresponding with the at least one token from the control structure and using the metadata reference to obtain the metadata object from an external storage system, determining one or more network access rights or restrictions of the at least one computing device on the protected network using at least one of the one or more access parameters and the at least one request parameter, and providing or restricting access of the at least one computing device to one or more functions or resources of the protected network based on the one or more network access rights or restrictions.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers indicate identical, functionally similar, and/or structurally similar elements.

Figure 1:
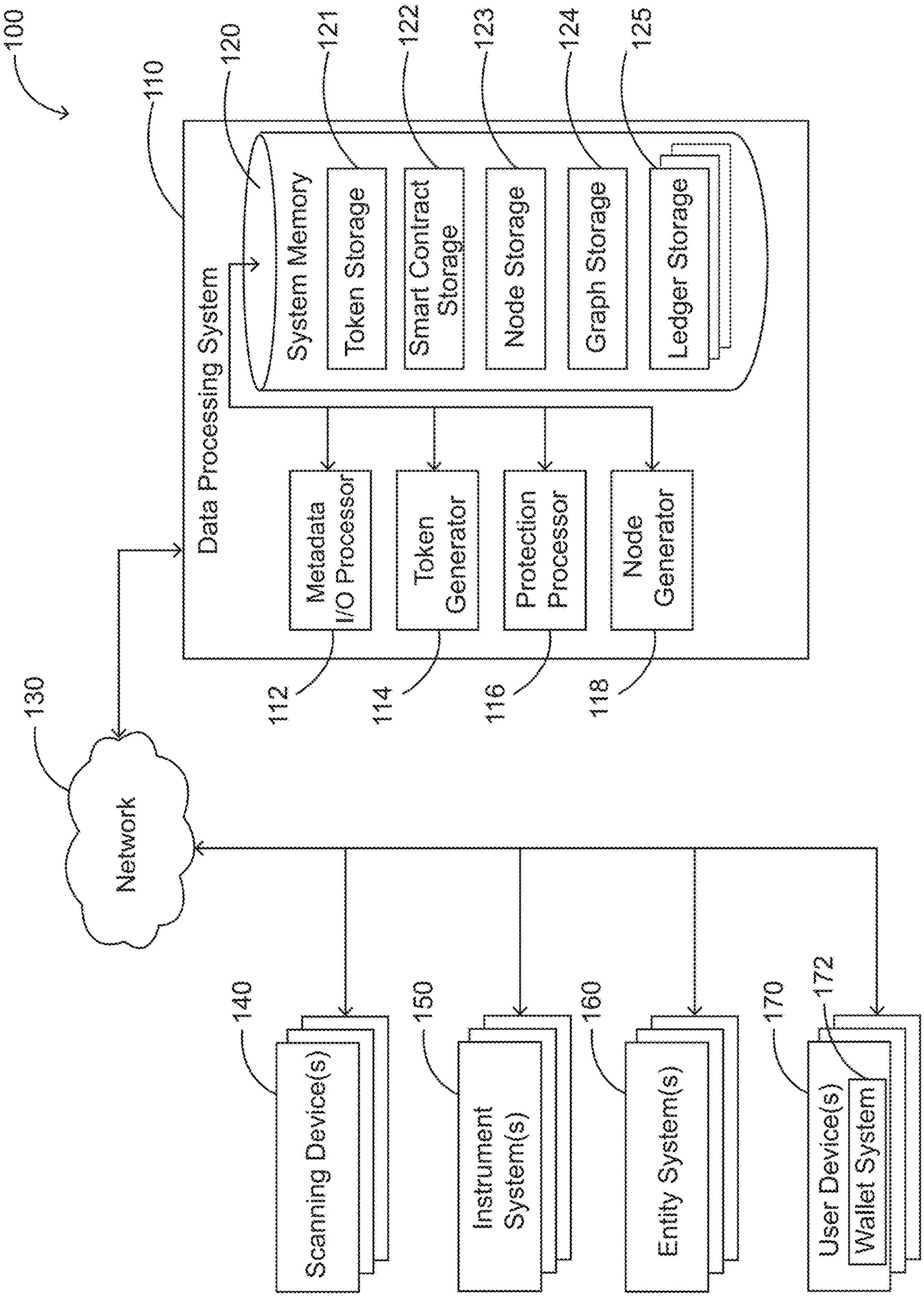
FIG. 1 depicts a block diagram of an example system, according to some implementations.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

The systems and methods herein relate to node-based network access control and resource protection. In modern implementations, provider institutions, enterprises, platforms, and/or applications can regulate access to networked data and/or services. For example, some systems can prompt for usernames, passwords, biometrics, and/or passkeys as a condition to accessing data and/or services, and some systems can validate exchanges by comparing exchange information to static records. However, modern implementations may lack mechanisms to dynamically assign, identify, monitor, and/or update authentication or validation information, which can decrease data security, reduce computational efficiency, and increase memory load and processing overhead by introducing redundant computationally processes.

For example, some systems use multiple or independent authentication steps to provide access to data and/or services. That is, a user or device can be prompted to authenticate separately when accessing a provider platform, when switching between applications within the platform, and/or when performing an action within an application. However, processing separate authentication events increases memory load by causing additional back-end processing for each login attempt and associated multi-factor authentication (MFA) and/or two-factor authentication (2FA). Processing separate authentication events also introduces latency by delaying network access and/or slowing perceived response times to access requests. In addition, processing multiple login attempts increases the frequency of transmission of sensitive or confidential user information, which decreases data security by increasing the chance of data exposure or breach. Because modern implementations use static information, such authentication events can also be redundant and/or fail to improve security.

For example, modern implementations can lack mechanisms to track real-time updates to a security status or a change in network conditions, such as modifications to device trust levels or user access permissions. That is, some modern implementations do not dynamically identify access control changes, such as a real-time (or near real-time) revocation of access after an initial authentication or validation event. As a result, access decisions can be made without verifying whether a previously authenticated device or resource remains secure at the time of use, and using such outdated authentication can cause operational errors that lead to security vulnerabilities. In addition, some systems fail to dynamically update access information to reflect real-time access conditions. For example, using static data to identify devices or users can link the utility of such data to a particular network, which reduces cross-network interoperability. Further, when access permissions or trust conditions change, manual updates or additional validation steps are used, which can increase processing demands and system latency.

Systems and methods in accordance with the present disclosure can address these challenges by providing node-based network access control and resource protection using a decentralized physical infrastructure network (DePin). For example, the systems and methods herein can generate and/or determine a node (e.g., a decentralized identifier (DID) or other identifier) to manage various physical devices and/or resources (e.g., employee devices, customer devices, transaction cards, checks, etc.) on a provider network. In some implementations, the systems and methods herein can assign a node in response to device registration (e.g., onboarding an employee or customer device) and/or resource instrument activation (e.g., activating a card or check) to verify associated access permissions, track changes in trust status, or dynamically update authentication information.

For example, the systems and methods herein improve network authentication efficiency and security by using nodes to manage and update authentication states and access permissions. That is, the systems and methods herein can reduce the performance of separate authentication events within an application and/or platform by linking an assigned node to authentication metadata (e.g., a metadata object) that can be updated dynamically, which reduces redundant computational tasks used to process multiple login attempts. For example, if a device has been previously authenticated within a provider platform, the system can reference a metadata object associated with the node to determine whether access remains permitted and can bypass redundant login attempts and MFA or 2FA prompts when providing access to additional services associated with the platform. In addition, the systems and methods herein can improve network security by using a smart contract and metadata object associated with a node to enforce real-time updates or trust conditions. For example, if a security status of a device or instrument changes due to a detected risk condition (e.g., unauthorized location change, failed authentication attempt, or revocation), the smart contract can update the metadata object to prevent further access attempts in-real time. Updating the metadata object dynamically can reduce the frequency of periodic security updates and/or manual interventions, which can introduce delays and increase the risk of unauthorized access.

In addition, the systems and methods herein improve fraud detection and fraud prevention by using node-based authentication to reduce data exposure risks. That is, by associating a node with a device or resource instrument, authentication and transaction validation can be performed without repeatedly transmitting sensitive user credentials over a network, thereby minimizing the risk of credential interception or unauthorized access. For example, when a transaction is initiated, the systems and methods herein can verify a device or resource instrument by referencing the associated node and retrieving authentication metadata, which prevents attackers from exploiting credential re-entry vulnerabilities, such as phishing attacks or replay attacks that leverage intercepted authentication data. Additionally, because access decisions can be based on real-time trust conditions linked to a node, the systems and methods herein can detect and block unauthorized activity (e.g., a fraudulent transaction attempted from previously-cashed check or a stolen device) in real-time. For example, the systems and methods herein can use a smart contract linked with the node to automatically apply additional authentication requirements, temporarily disable resource or device access, or revoke network access in response to detecting unauthorized and/or anomalous activity on the network.

In addition, the systems and methods herein improve data interoperability and security by using decentralized techniques for node-based access control and resource protection. That is, the systems and methods herein can use node-based authentication to facilitate identity-based verification of physical devices and/or resources across multiple provider networks and validate that authentication metadata remains unchanged, tamper-resistant, and/or accurate. For example, using centralized identity management frameworks in which static authentication records are stored within a single provider network and are to be manually reconciled across different platforms can cause authentication delays, operational failures, and/or inconsistencies in access permissions. To address these challenges, the systems and methods herein can store node-related information or data structures (e.g., a smart contracts, token identifiers, etc.) in a decentralized storage system (e.g., blockchain registry) with cryptographic proof of the validity and/or authenticity of the stored information. That is, the systems and methods herein can generate and/or provide a public-private key pair with the node, which can be used to verify that updates or modifications associated with metadata of the node are cryptographically signed by the node owner and/or another authorized entity. In addition, the systems and methods herein can generate a node as a decentralized identifier that is structured to include information used to resolve the node (e.g., a DID method identifier that indicates how metadata associated with the node can be retrieved across provider networks). For example, in response to receiving an authentication request, the systems and methods herein can use the content and/or structure of the node to retrieve authentication metadata from a decentralized registry and use the metadata to inform real-time access decision without using on a centralized authority.

As used herein, a "user" can refer to an entity identified by and/or corresponding with a node (e.g., decentralized identifier (DID) and/or other identifier) used by at least one (e.g., each) of one or more networks (e.g., provider institution, platform, application, enterprise, etc.). In some implementations, a user can include a customer, employee, client, and/or operator of one or more provider institutions, platforms, applications, enterprises, etc. In some implementations, a user can use and/or otherwise interface with at least one computing system (e.g., a user device) to interact with one or more of multiple provider institutions, platforms, applications, and/or enterprises to exchange data and/or perform operations, and the computing system of the user can be identified by a node.

As used herein, a "node" (sometimes referred to herein as a "decentralized identifier" or "DID") can refer to a data structure configured to identify a corresponding user, system, resource, and/or instrument in a networked environment. In some implementations, a DID can be generated independently of a centralized authority (e.g., a government or certificate authority), such that an entity associated with the DID, referred to as a controller, can independently verify control or ownership of the DID. In some implementations, a DID can include a reference (e.g., a uniform resource identifier (URI)) that links the DID to a corresponding data structure. For example, a DID can include a reference to a tokenized data structure (e.g., a dynamic non-fungible token (dNFT) or other digital token) and/or metadata object storing and/or encapsulating metadata corresponding with the user, system, or resource instrument associated with the DID.

In some implementations, the tokenized data structure can store metadata and cryptographic information corresponding to the node (e.g., DID and/or any other identifier), including authentication parameters, verification methods, and/or service endpoints to facilitate secure interactions with networked systems or entities using the node. In some implementations, an identifier of the tokenized data structure can be recorded on a ledger (e.g., blockchain storage, database, graph storage, or another data source) and used to access tokenized metadata including access parameters, stored references, cryptographic keys, service endpoints, and/or signatures associated with the DID. In some implementations, a DID can be used to identify a corresponding user, resource, device, system, instrument, and/or other data element on a protected network (e.g., a provider institution network) and/or additional networks (e.g., third party networks). For example, a DID (a node) can include a structure or formatted data sequence including at least a method identifier, namespace identifier, and a method-specific identifier, which can define operations for generating, updating, and/or resolving the DID and can be used by other networked systems or users to identify metadata corresponding with the DID, as further described herein.

As used herein, "smart contract" or "control structure" can refer to a self-executing code (e.g., in a ledger network or other system) that executes when a set of conditions that have been agreed upon by the parties of the smart contract are met. Although the FIGS. and specification generally discuss utilizing smart contracts or control structures on resources or digital assets, the systems, methods, and apparatuses disclosed herein can also be used for a plurality of types of non-fungible or fungible resources or assets, including but not limited to commodities, common shares, options, dollar bills, fiat currency, digital currency, tokens, deeds, leases, wills, trusts, other exchanges, non-smart contracts, traditional legal contracts, financial disbursements, taxes, and other types of non-fungible or fungible assets parties use and exchange. Parties to the smart contract for funds or digital assets or other types of non-fungible or fungible assets can be individuals, companies, organizations, entities, providers, the government, and so on.

As used herein, in some implementations, a "digital asset" (or a "tokenized asset") can include and/or otherwise refer to a data package or structure including information (e.g., values in fields) and an amount of digital or virtual currency that is owned by one or more parties (e.g., user, individual, institution, company, or so on) and used to perform exchanges (e.g., for goods or services) in a computer networked environment. The digital asset can be encrypted and decrypted using one or more public and private key pairs (sometimes referred to as a "verification and signing key pair"). In some implementations, the digital asset can be in the form of a token (e.g., a fungible token or a Non-Fungible Token (NFT)). In some implementations, a digital asset can be a digital form of a fiat currency of one or more nations, one or more countries, or one or more regions.

In some implementations, the digital asset can be issued by a central provider (e.g., Federal Reserve System (FRS)), or by a particular provider (e.g., bank). The digital asset can be a Math-Based Currency (MBC) (e.g., cryptocurrency, Bitcoin, Ethereum, Stablecoin Tether (USDT), USD Coin (USDC)) or derived (for example, as a token) from cryptocurrency. The digital asset can be a central bank digital currency (CBDC) (e.g., Digital USD, Digital Euro, Digital Japanese Yen, Digital British Pound, Digital Swiss Franc) or derived (for example, as a token) from CBDC. In various implementations, the digital asset can include information in one or more metadata fields that can be modified by the one or more parties. Furthermore, smart contracts can be configured to provide one or more functionalities of the digital asset and can be wrapped into the data package or block data of the digital asset.

As used herein, an "exchange" can refer to a transfer of a digital asset or resource of a first user (transferor or sender) to a second user (transferee or receiver), where both the first user and the second user to the exchange are identified by respective identifiers. Examples of exchanges include transferring the digital asset from a digital wallet of the first user to a digital wallet of the second user, updating an ownership of the digital asset in distributed ledgers or blockchain databases, updating the public-private key pair of the digital asset to include the public key of the second user to be associated with the digital asset, etc.

Additionally, in the context of the exchange processes corresponding with digital assets within a DLT network, public and private key pairs can be used to verify the security and integrity of exchanges. The key pairs can be used for encryption and decryption processes to safeguard the digital assets and validate exchanges. For example, when a first user (transferor or sender) initiates an exchange request on a first DLT network, a private key of the first user can be used to sign the exchange. The digital signature of the first user can verify that the exchange has been initiated by the rightful owner of the digital asset.

In some examples, the exchange and/or an exchange object, including data such as a source identifier, destination identifier, and amount of the digital asset (e.g., MBC) can be encrypted using the private key of the first user. The encryption using the first key of the first user can validate that exchange and/or an exchange object data remain secure and tamper-proof as the exchange and/or an exchange object data is transmitted and received over a network. In this example, on the receiving end, the processing circuits associated with a second DLT network can use the public key of the first user to decrypt and validate the exchange notification. The public key can decrypt the exchange and/or an exchange object encrypted by the corresponding private key and thereby confirm the authenticity and integrity of the exchange. Moreover, the process of creating a new block on the blockchain in both DLT networks can include the use of public and private keys. For example, when a new block is created and added to the blockchain, the block can be encrypted with a private key and can be verified by entities on the network using the corresponding public key.

It should be understood that "real-time" as used herein does not necessarily mean instantaneous, and can refer to a process or system in which information is updated at a frequency that is suitable for an intended purpose, thus facilitating timely responses and decisions based on the most recent data available.

Referring now to FIG. 1, a block diagram illustrating an example system 100 is shown, according to some implementations. As illustrated by way of example in FIG. 1, an example system 100 can include at least a data processing system 110, network 130, scanning device(s) 140, instrument system(s) 150, entity system(s) 160, and/or user device(s) 170. In some implementations, the data processing system 110 can include a metadata input/output (I/O) processor 112, a token generator 114, a protection processor 116, and a node generator 118. In some implementations, the data processing system 110 can include system memory 120, which can include a token storage 121, smart contract storage 122, node storage 123, graph storage 124, and ledger storage 125. The user device(s) 170 can include a wallet system 172. Although the various computing elements of FIG. 1 can be described in the singular form below (e.g., network 130, user device(s) 140, etc.), it should be understood that the example system 100 can include two or more of any device/system described herein (e.g., two or more network(s) 130, two or more user computing device(s) 170, etc.).

In some implementations, the example system 100 can include and/or otherwise correspond with a decentralized physical infrastructure network (DePin). For example, a DePin can include a network of physical and/or digital infrastructure resources that are deployed, operated, and/or accessed using decentralized technologies such as blockchain-based ledgers, decentralized identifiers (DIDs), cryptographic tokens, and/or smart contracts. That is, independent participants (e.g., individuals, businesses, service providers) can use a DePin to interact with, access, and/or manage shared infrastructure without relying on a central authority. For example, the example system 100 can include and/or use a decentralized physical infrastructure network to manage decentralized identifiers (DIDs) and corresponding tokenized representations of infrastructure components for access control and/or resource validation. In some implementations, the example system 100 can include and/or integrate with cloud-based infrastructure to facilitate decentralized authentication, trust verification, and/or secure interactions with infrastructure components.

In some implementations, the data processing system 110 can be configured or structured to perform and/or otherwise facilitate various operations for node-based network access control and/or node-based resource protection, as further described herein. For example, the data processing system 110 can perform operations including, but not limited to, transmitting or receiving data, updating or outputting data, generating or determining nodes, generating or retrieving tokens, identifying tokenized data or identifiers, accessing metadata objects, performing device authentication or resource validation, analyzing or updating metadata, executing or performing network operations, interfacing with control structures, storing data or accessing stored data, determining network access rights or restrictions, providing network or resource access, and/or generating confirmations or alerts. In some implementations, one or more of the subcomponents of the data processing system 110, such as metadata I/O processor 112, token generator 114, protection processor 116, and/or node generator 118, and/or other systems or components of FIG. 1 (e.g., system memory 120) can be configured or structured to facilitate such operations, as further described herein.

The data processing system 110 can be owned by, or otherwise associated with, a provider institution or an organization that provides services to users and entities and/or facilitates exchanges of resources and/or assets. In some implementations, the data processing system 110 can be configured retrieve and/or manage data from various internal or sources. That is, the data processing system 110 can identify or obtain exchange data, process the exchange data, generate cryptographic objects, and/or maintain records of such data or objects. For example, the data processing system 110 can receive and/or transmit data with sources such as trading platforms, banks, and regulatory authorities associated with the provider institution.

In some implementations, one or more of the data processing system 110, system memory 120, network 130, scanning device(s) 140, instrument system(s) 150, entity system(s) 160, user device(s) 170 and/or included subsystems of the data processing system 110 (e.g., metadata I/O processor 112, token generator 114, protection processor 116, and/or node generator 118) can include at least one processing system or device, such as a computing device having at least one processing circuit configured to execute instructions stored thereon (e.g., in a non-transitory computer readable memory device) to perform one or more operations described herein. The processing circuit can include a processor, such as a microprocessor, an application-specific integrated circuit (ASIC), a field-programmable gate array (FPGA), and/or combinations thereof. The processing circuit can include a memory, and/or the memory can include, but is not limited to, electronic, optical, magnetic, and/or any other storage or transmission device capable of providing processor(s) with program instructions. The instructions can include code from any suitable computer programming language such as. The memory can be included in the processing circuit and can include, but is not limited to, electronic, optical, magnetic, and/or any other storage devices capable of providing a processor or processing circuit with program instructions.

Figure 6:
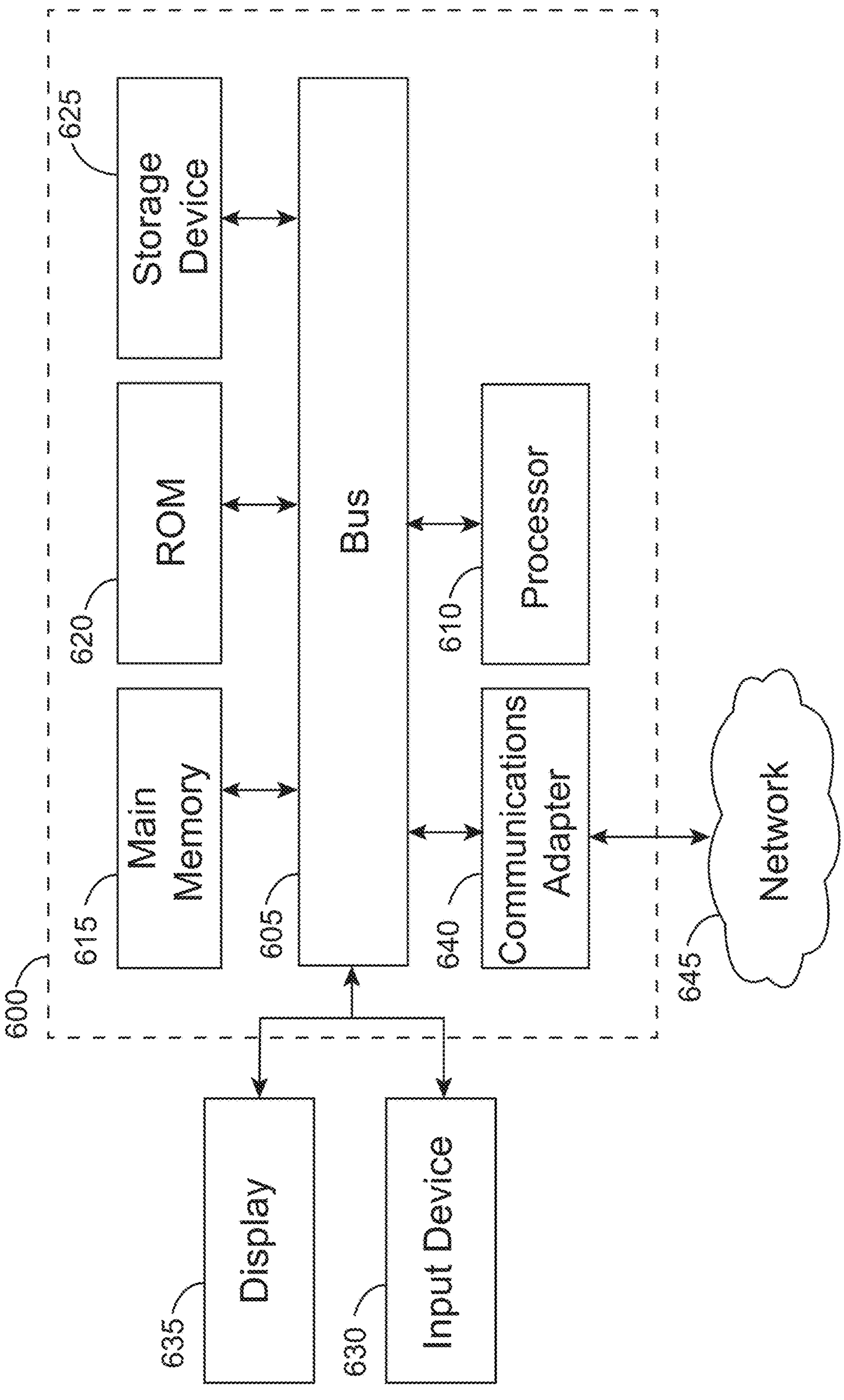
FIG. 6 depicts a block diagram illustrating an example computing system for use in the various implementations described herein.

In some implementations, one or more of the data processing system 110, system memory 120, network 130, scanning device(s) 140, instrument system(s) 150, entity system(s) 160, user device(s) 170 and/or included subsystems of the data processing system 110 (e.g., metadata I/O processor 112, token generator 114, protection processor 116, and/or node generator 118) can include the structural components of the computing device described in FIG. 6, which can be used to run or otherwise implement the various functionalities and/or features described herein. In other implementations, one or more elements of the example system 100 can include a distributed processing cluster, server, cloud processing system, and/or any other computing device or system. That is, the one or more of the systems of elements of example system 100 can include or execute at least one computer program or at least one script. In some implementations, one or more elements of the example system 100 can include combinations of software and hardware, such as one or more processors configured to execute one or more code packages and/or scripts.

In some implementations, components of the example system 100 (e.g., data processing system 110, user device(s) 170, etc.) can communicate and/or otherwise facilitate interactions over network 130. Network 130 can include computer networks such as the Internet, local, wide, metro or other area networks, intranets, satellite networks, other computer networks such as voice or data mobile phone communication networks, combinations thereof, and/or any other type of electronic communications network. Network 130 can include or constitute a display network. In various implementations, network 130 facilitates secure communication between components of example system 100. As a non-limiting example, network 130 can implement transport layer security (TLS), secure sockets layer (SSL), hypertext transfer protocol secure (HTTPS), and/or any other secure communication protocol.

In some implementations, network 130 can be composed of various network devices (nodes) communicatively linked to form one or more data communication paths between participating devices. The network 130 can facilitate communication between various computing devices and/or systems, such as the data processing system 110, system memory 120, network 130, scanning device(s) 140, instrument system(s) 150, entity system(s) 160, and/or user device(s) 170 (e.g., using an OSI layer-4 transport protocol such as the User Datagram Protocol (UDP), the Transmission Control Protocol (TCP), Stream Control Transmission Protocol (SCTP)). At least one (e.g., each) networked device can include at least one network interface for receiving and/or transmitting data, typically as one or more data packets. An illustrative network 130 can include the Internet; however, other networks can be used. The network 130 can include a type of a broadcast network, a telecommunications network, a data communication network, and/or a computer network.

The metadata input/output (I/O) processor 112 can include at least one processor structured or configured to identify metadata (sometimes referred to as "attributes" or "rules" or "characteristics") of one or more tokens. The metadata I/O processor 112 can generate a parameter, attribute, or indicator corresponding to one or more characteristics of a token or metadata linked with the token. For example, the metadata I/O processor 112 can identify one or more parameters, attributes, or indicators of an individual token or a plurality of tokens. For example, criteria by which token can be identified can include aspects of the token, fields or components of the token, transform processes used to generate or modify the token, aspects of a metadata object linked with the token, or any combination thereof. For example, aspects of the token can include a hash of the token, or a value of an individual field of the token. For example, aspects of a metadata object linked with the token can include a bitmap of an image linked with the token, or a hash of a media metadata linked with the token. Media metadata can include images, audio, three-dimensional (3D) models, or any combination thereof.

Additionally, the metadata I/O processor 112 can obtain one or more metadata objects. The metadata I/O processor 112 can communicate with one or more external systems via the network 130, and can obtain one or more metadata objects via the network 130. The metadata I/O processor 112 can generate metadata objects that can be transmitted to a computing device, including, for example, the user device 170. The metadata I/O processor 112 can identify one or more characteristics of a metadata object. For example, the metadata I/O processor 112 can obtain and identify metadata objects including video, audio, text, any media, executable programs, or any combination thereof. The metadata I/O processor 112 can transmit one or more of metadata objects or references or links with one or more metadata objects to the token generator 114.

The token generator 114 can include at least one processor structured or configured to generate and modify one or more tokens. Additionally, the token generator 114 can be structured or configured to validate one or more tokens against one or more smart contracts. The token generator 114 can generate and/or otherwise obtain one or more tokens, and can compare one or more token to one or more tokens requested by a particular smart contract. The token generator 114 can detect a particular token compatible with a particular smart contract by detecting a particular token matches a particular token characteristic associated with a particular smart contract. For example, the token generator 114 can detect that a token is compatible with a smart contract based on comparing a hash of the token with a hash included in the smart contract. The token generator 114 can generate an authorization or validation indication based on one or more determinations, and can transmit the authorization indication to the protection processor 116. The token generator 114 can, for example, execute the smart contract with the compatible tokens to retrieve a particular control structure for the smart contract, or a reference to the particular control structure, from the smart contract storage 122.

The protection processor 116 can include at least one processor structured or configured to execute one or more instructions associated with the system 100. The protection processor 116 can include an electronic processor, an integrated circuit, and so on including one or more of digital logic, analog logic, digital sensors, analog sensors, communication buses, volatile memory, nonvolatile memory, and so on. The protection processor 116 can include, but is not limited to, at least one microcontroller unit (MCU), microprocessor unit (MPU), central processing unit (CPU), graphics processing unit (GPU), physics processing unit (PPU), embedded controller (EC), and so on. The protection processor 116 can include a memory operable to store or storing one or more instructions for operating components of the protection processor 116 and operating components operably coupled to the protection processor 116. The one or more instructions can include at least one of firmware, software, hardware, operating systems, embedded operating systems, and so on. The protection processor 116 or the system 100 generally can include at least one communication bus controller to effect communication between the protection processor 116 and the other elements of the system 100.

The protection processor 116 can include an interface controller configured to communicate with one or more external systems to transmit and/or receive a token. For example, the interface controller can be implemented using processing circuits that can include processors and memory. Examples of such processing circuits could include microprocessors for executing software instructions, digital signal processors for managing data transmissions, and volatile or non-volatile memory units for storing operational data and token information. For example, the interface controller can include an application programming interface (API) compatible with a third-party device and/or the entity system(s) 160. For example, the interface controller can be configured to receive data or information associated with particular tokens, types of tokens, or metadata objects linked with particular tokens.

The node generator 118 can include at least one processor structured or configured to generate, modify, and/or manage network nodes, including decentralized identifiers (DIDs) and associated metadata. The node generator 118 can include a node model configured to execute instructions to generate a node using a node function (e.g., by applying one or more transformations, mappings, or derivations to input metadata). For example, the node generator 118 can derive a method-specific identifier for a DID by applying a deterministic function to an input data structure (e.g., hashing a concatenation of metadata fields or performing a cryptographic transformation). The node generator 118 can format a node according to a predefined schema or structure such that node information (e.g., a DID document, metadata object, token, and so on) can be retrieved based on attributes, relationships, and/or references included in the DID. For example, the formatted node can be queried using a namespace identifier in a hierarchical lookup, resolved through graph traversal using linked edges, or matched against encoded attributes in a distributed ledger to retrieve corresponding node information. The node generator 118 can interface with external storage systems (e.g., node storage 123, graph storage 124, ledger storage 125, and so on) to store and/or update generated nodes and/or corresponding metadata, as further described herein.

In some implementations, in addition to processing circuit (s), the data processing system 110 can include and/or be communicatively coupled to one or more databases and/or data sources (e.g., system memory 120). The system memory 120 can include one or more hardware memory devices to store binary data, digital data, and so on. The system memory 120 can include one or more electrical components, electronic components, programmable electronic components, reprogrammable electronic components, integrated circuits, semiconductor devices, flip flops, arithmetic units, or and so on. The system memory 120 can include at least one of a non-volatile memory device, a solid-state memory device, a flash memory device, and a NAND memory device. The system memory 120 can include one or more addressable memory regions disposed on one or more physical memory arrays. A physical memory array can include a NAND gate array disposed on, for example, at least one of a particular semiconductor device, integrated circuit device, and printed circuit board device.

For example, the system memory 120 can include a data repository that can store various data elements or structures. In some implementations, the system memory 120 can include data structures for storing information such as, but not limited to, nodes and/or information related to nodes (e.g., decentralized identifiers (DIDs), first nodes or second corresponding with users, computing devices, or resource instruments, node metadata, relationships between nodes and linked entities, node state data, and/or node exchange records), tokens and/or metadata objects (e.g., cryptographic tokens linked to control structures, dynamic non-fungible tokens (dNFTs) or other tokenized data structures, token states and associated identifiers, metadata records corresponding with network access policies, and/or resource-linked metadata), user data (e.g., user profiles, user wallet data, usernames, passwords, passkeys, roles, permissions, restrictions, account attributes, linked user identifiers or corresponding nodes, authentication data, biometric data, and/or historical access data), and/or device data or system information (e.g., device identifiers or nodes, device attributes, hardware security parameters, passkeys, wallet data, device compliance data, geolocation data, biometric data, sensor data, device-generated cryptographic keys, platform configurations, and/or operational states).

In some implementations, the system memory 120 can include data structures for storing information such as, but not limited to, network access data and/or metadata (e.g., network access rights or restrictions, access parameters, access context parameters such as location-based or time-based conditions, and/or authentication event records, authentication credentials, request parameters, permitted network operations, session state records, and/or network policy attributes), resource instrument data and/or metadata (e.g., account numbers and/or identifiers, resources, assets, functions, linked nodes, lifecycle indicators, state data, allocation conditions, authentication parameters, and/or historical usage records), control structures and/or related data (e.g., smart contract instructions, control logic, output and/or update conditions, access control policies), authentication and/or security data (e.g., cryptographic hashes, encryption keys, digital signatures, authentication protocols, public-private key pairs, verification methods, access control lists, and/or security event logs), and/or graph storage data (e.g., knowledge graph(s), node structures corresponding with computing devices, resource instruments, or user accounts, primary and secondary node relationships, node linkage identifiers, edge attributes representing permissions, ownership, or associations, graph traversal mappings, and/or hierarchical role-based access structures).

In some implementations, the system memory 120 can include data structures for storing information such as, but not limited to, external data references (e.g., uniform resource identifiers (URIs) linking metadata objects, ledger transaction records, third-party verification endpoints, audit history records, and/or service endpoints for network interactions), operational and/or event data or metadata (e.g., timestamps, request origin indicators, audit logs, compliance status records, network event triggers, and/or session data), transaction and/or resource processing data (e.g., execution conditions for request handling, conditions for permitting or restricting network functions, state transitions of resource instruments, and/or validation rules for determining access rights), and/or other data or information (e.g., digital and/or non-digital asset or resource data, ledger records, governance rules, node generation functions, event triggers, and/or verification data). In some implementations, system memory 120 can store various data elements in structured or unstructured formats and can interface with the data processing system 110 and/or included subcomponents (e.g., metadata I/O processor 112, token generator 114, protection processor 116, and/or node generator 118) to facilitate various operations, as further described herein.

In some implementations, the system memory 120 can include token storage 121, smart contract storage 122, node storage 123, graph storage 124, and ledger storage 125. In some implementations, the token storage 121 can include and/or otherwise refer to any storage system configured to store cryptographic tokens and/or associated metadata objects. For example, the token storage 121 can store dynamic non-fungible tokens (dNFTs) or other cryptographic tokens linked to control structures that restrict or govern outputs or updates of metadata objects. In some implementations, the token storage 121 can include and/or interface with a database system, a user wallet system (e.g., wallet system 172), a distributed storage system, and/or a blockchain-based storage system to store and/or manage tokens. For example, the token storage 121 can include and/or otherwise refer to a ledger or configured to store, record, analyze, retrieve, update, and/or provide tokenized data or metadata (e.g., network access data and/or resource data). In some implementations, the data processing system 110 can interface with token storage 121 to query and/or retrieve tokenized data, analyze metadata corresponding to stored tokens, and/or validate token information based on network access requests and/or resource update requests.

In some implementations, the smart contract storage 122 can include and/or otherwise refer to any storage system configured to store data (e.g., logic, instructions, conditions, parameters, identifiers, or tokens, and so on) associated with smart contracts or control structures. For example, the smart contract storage 122 can store one or more smart contracts (e.g., control structures) and corresponding addresses for particular smart contracts that indicate links with the corresponding smart contracts. In some implementations, the smart contract storage 122 can be configured to provide data associated with one or more smart contracts to the data processing system 110, and the data processing system 110 can compile the provided data to generate bytecode of the one or more smart contracts for storage on a blockchain (e.g., ledger storage 125). For example, the data processing system 110 can generate bytecode by compiling and recording at least a portion of the permissions, conditions, execution rules, and/or metadata associated with one or more smart contracts stored in smart contract storage 122. In some examples, bytecode can include or refer to a representation of smart contract instructions configured for execution via a virtual machine (VM) or smart contract execution environment (e.g., on a blockchain network).

In some implementations, the node storage 123 can include and/or otherwise refer to any storage system configured to store information related to one or more nodes (e.g., decentralized identifiers (DIDs), universal unique identifiers (UUIDs), account identifiers, Uniform Resource Identifiers (URIs), and so on) and/or associated metadata objects. For example, the node storage 123 can store data including first nodes and/or second nodes corresponding with users, computing devices, or resource instruments, as well as relationships (e.g., associated account information) between the nodes. For example, the node storage 123 can store and/or provide state data for nodes (e.g., a current authentication status), node lifecycle information (e.g., activation or revocation data), references or storage addresses of related nodes, and/or interaction data associated with transactions or updates of nodes. In some implementations, the node storage 123 can include and/or interface with a distributed ledger system, a graph database, and/or a hierarchical storage system to manage, retrieve, and/or update node-related data. For example, the node storage 123 can include and/or interface with graph storage 124. The data processing system 110 can interface with node storage 123 to determine node relationships, validate node-based access conditions, and/or retrieve node metadata for processing network access requests or resource updates.

In some implementations, the graph storage 124 can include and/or otherwise refer to any storage system configured to store and manage graph-based data structures representing relationships between nodes. For example, the graph storage 124 can include a knowledge graph with a plurality of nodes connected by a plurality of edges, with the plurality of edges including weights representation relationships between the plurality of nodes. A knowledge graph can include or refer to any structured data model that represents entities, objects, or systems as nodes interconnected by edges that define relationships, attributes, or contextual dependencies (e.g., ontology-based data models, semantic web frameworks, graph neural network (GNN) implementations, or property graph-based storage systems). The graph storage 124 can store primary nodes (e.g., entity nodes corresponding to a user or user account), secondary nodes (e.g., device nodes or resource nodes corresponding to an entity or account), identifiers or links between nodes, edge attributes, metadata associations, and/or graph traversal mappings for identifying nodes or corresponding metadata. In some implementations, the graph storage 124 can include and/or interface with a graph database, a distributed ledger system, and/or a relational database to manage and store nodes and/or corresponding metadata. The data processing system 110 can interface with graph storage 124 to analyze node relationships, retrieve linked metadata, and/or determine network access conditions based on graphical features or structures associated with the plurality of stored nodes.

In some implementations, the ledger storage 125 can include and/or otherwise refer to any storage system configured to store and manage immutable records of transactions, operations, or updates associated with decentralized or distributed network interactions. For example, the ledger storage 125 can represent one or more blockchains linked to one or more smart contracts, tokens, control structures, or metadata objects, with corresponding addresses indicating associations between particular smart contracts, tokens, control structures, or metadata objects and a particular blockchain. For example, the ledger storage 125 can include a blockchain registry configured to nodes or node-related information as one or more blocks. That is, transactions associated with nodes (e.g., updates to decentralized identifiers (DIDs), node state modifications, or authentication events) can be grouped and/or recorded within blocks that are distributed across computing nodes of ledger storage 125. For example, the computing nodes of ledger storage 125 can include blockchain validator nodes or other networked computing systems that store replicated blocks and/or associated state information. In some examples, the ledger storage 125 can store cryptographic hashes, digital signatures, transaction logs, audit trails, access control updates, and/or validation records corresponding to recorded operations. In some implementations, the ledger storage 125 can include and/or interface with a blockchain-based storage system, a distributed ledger framework, and/or a cryptographic transaction log system to store and update secure, verifiable, and/or tamper-resistant data records. The data processing system 110 can interface with ledger storage 125 to validate transactions, retrieve historical records, and/or verify control structures based on recorded blockchain data.

In some implementations, the scanning device(s) 140 can include and/or otherwise refer to any system including a combination of hardware or software system configured to capture, extract, and/or process encoded data from a resource instrument, computing device, or other object including a machine-readable representation of data. For example, the scanning device(s) 140 can include optical scanners, radio frequency identification (RFID) readers, near-field communication (NFC) readers, barcode or QR code scanners, biometric scanners, and/or embedded sensor systems configured or structured to detect encoded data of a resource instrument. The scanning device(s) 140 can interface with the data processing system 110 and/or entity system(s) 160 to retrieve, validate, and/or transmit scanned data for further processing. For example, the scanning device(s) 140 can extract an encoded identifier from a resource instrument (e.g., a restricted-usage or persistent-usage instrument) and transmit the identifier to the data processing system 110 for validation.

In some implementations, the instrument system(s) 150 can include and/or otherwise refer to any hardware or software system configured to process transactions, manage resource instruments, and/or facilitate network interactions based on scanned or received data. For example, the instrument system(s) 150 can include point-of-sale (POS) system, an automated teller machine (ATM), a self-service kiosk, a desktop computer, a mobile device, a secure transaction terminal, or any payment and/or authentication device or platform. In some implementations, the instrument system(s) 150 can interface with the scanning device(s) 140 to receive encoded data from a resource instrument and transmit corresponding transaction or validation requests to the data processing system 110. Based on responses received from the data processing system 110 (e.g., verification of a resource lifecycle indicator, retrieval of access parameters, or confirmation of a transaction authorization), the instrument system(s) 150 can initiate, restrict, or modify a resource-related operation.

In some implementations, one or more the entity system(s) 160 can be owned by, or otherwise associated with, the provider institution of data processing system 110. In some implementations, one or more the entity system(s) 160 can be associated with third-parties or other entities relative to the provider institution associated with the data processing system 110. As such, the third-parties or entities can include regulatory authorities, financial institutions, trading platforms, and/or other entities that can provide data elements associated with exchanges with users but maintained by third-parties relative to the provider institution. In some implementations, the various components of the example system 100 can interact with the entity system(s) 160 to retrieve and/or update data or information (e.g., token updates or exchanges, transaction records, resource information, key-value pairs, certificates, financial data) between the provider institution and the third-parties and/or other entities, as further described herein.

In some implementations, the user device(s) 170 (sometimes, depending on the configuration of the user device(s), the user device(s) can be referred to herein as an “electronic device,” “computing system,” “mobile device,” or “mobile electronic device") can be a computing device, personal computer (PC), desktop computer, laptop computer, smartphone, tablet, smart watch, smart sensor, or any other device configured to facilitate receiving, displaying, and interacting with content (e.g., applications) or data (e.g., transaction data, cryptographic objects, metadata). For example, user device(s) 170 can be a cell phone configured to execute an application to receive and display content and/or actionable elements and to receive user interaction with the content and/or actionable elements. The user device(s) 170 can also include an input/output circuit for communicating data over network 130. The user device(s) 170 can include customer devices (e.g., owned and/or operated by clients or customers of the provider institution) and/or employee devices (e.g., owned and/or operated by employees of the provider institution). For example, the user device(s) 170 can include employee devices owned by the employee (e.g., user-provisioned or "bring-your-own" devices) and/or owned by the provider institution (e.g., employer-provisioned devices).

In some implementations, the user device(s) 170 can include an application. The user device(s) 170 can include a plurality of applications. In some implementations, the user device(s) 170 can execute an application (e.g., web browser) to link or synchronize data elements, transactions, and/or accounts between the data processing system 110 and various systems or subsystems of example system 100. For example, the application can be configured to retrieve content from other computing systems and devices over the network 130 for displaying transaction and/or account information to a user with the user device(s) 170. Additionally or alternatively, the application can be a mobile application executed by the user device(s) 170. The application can be a mobile application, such as a mobile banking application, which can be downloaded from an app store, pre-installed, or hard coded into memory of the device.

In some examples, the application can be provided and at least partly supported by the provider institution associated with the data processing system 110. Thus, the application can be referred to as a provider application or provider mobile application. As mentioned herein, the provider institution can provide various financial products, goods, and/or services. As such, the provider institution mobile application can provide various financial tools, such as transaction management, stock trades, home loan payments and creation, account monitoring, funds transfer, bill payments, and financial planning tools, and so on. In some implementations, the provider institution mobile application can be a part of a mobile banking application associated with the provider institution or a separate application.

In some implementations, the provider institution mobile application can include a collection of software development tools included in a package (e.g., software development kit (SDK), application programming interface (API), integrated development environment (IDE), debugger). For example, the provider institution mobile application can include an application programming interface (API) or a debugger, or an SDK that includes an API, a debugger, an IDE, and so on. In some implementations, the provider institution mobile application includes one or more libraries having functions that interface with a particular system software (e.g., iOS, Android, Linux). As a further example, the provider institution mobile application can include a function configured to collect and report data (e.g., transaction data, cryptographic objects, metadata, device analytics), and a user can insert the function into the instructions of the provider institution mobile application to cause the function to be called during actions of the provider institution mobile application (e.g., in response to identifying a transaction).

The provider mobile application can be installed and designed to run on smartphones, tablets, and other mobile devices. The provider mobile application can include a client-side application that interacts with server-side components over the network. The mobile application can be implemented using various programming languages and frameworks, such as Swift or Objective-C for iOS, and Kotlin or Java for Android. The provider mobile application can be packaged and distributed through app stores. In some implementations, the provider mobile application can include a presentation layer (UI/UX), a business logic layer, and a data layer. The presentation layer can handle user interactions and displays data using graphical user interface components. The business logic layer can process user inputs, manages application workflows, and enforces rules and policies. The data layer can manage data storage, retrieval, and synchronization with remote servers. The provider mobile application can utilize device capabilities such as cameras, GPS, accelerometers, and touchscreens. The provider mobile application can operate in online or offline modes, utilizing local storage and caching mechanisms to facilitate functionality when network connectivity is limited. Security measures, such as encryption, authentication, and secure communication protocols, can be implemented to protect user data and privacy.

In some implementations, the user device(s) 170 and the application can be configured to provide one or more interfaces (e.g., graphical user interfaces (GUIs)), including GUIs to authenticate devices, access protected networks, view and/or update assets or resources, view and/or update resource instrument data, and so on. In some implementations, the interfaces can include content items (e.g., for presenting content) and/or actionable elements (e.g., user-selectable or user-interactive features, such as a rebalancing or transfer button) and be presented via the application. In some implementations, the user device(s) 170 can update an arrangement of the content items and/or actionable elements presented on the GUI in response to receiving user input via an input device (e.g., touchscreen, keyboard, and so on).

In some implementations, the user device(s) 170 can include a wallet system 172. The wallet system 172 can include one or more tokens and keys corresponding to various account and linked with the user device(s) 170. For example, the wallet system 172 can encapsulate one or more tokens linked with the user device(s) 170 within a secure container and can include an interface compatible with one or more systems and/or subsystems of example system 100. The wallet system 172 can include and/or store one or more tokens. At least one (e.g., each) token stored by the wallet system 172 can correspond to particular metadata objects. For example, a token of the wallet system 172 can be associated with a particular metadata object and can be used to transmit output of the metadata object, transfer the metadata object to another storage location, or any combination thereof, for example. The tokens stored by the wallet system 172 can indicate control of particular metadata by a particular user linked with the wallet system 172 via a cryptographic key or key pair, by for example including in at least one (e.g., each token) the generated node (e.g., DID) or a link, address, or identifier of the block on a blockchain of the ledger storage 125 storing the generated node.

The wallet system 172 can include an interface to execute instructions corresponding to a particular wallet account, and to modify the structure or contents of a particular smart contract corresponding to a wallet account. For example, the wallet system 172 can be executed by user device(s) 170 and include a user interface to receive input indicating selections of various tokens, transactions, accounts, devices, users, or systems. The user interface can include a graphical user interface that can be presented at a display device of user device(s) 170. The display device can display at least one or more user interface presentations and can include an electronic display. An electronic display can include, for example, a liquid crystal display (LCD), a light-emitting diode (LED) display, an organic light-emitting diode (OLED) display, and so on. The display device can receive, for example, capacitive or resistive touch input. The wallet system 172 can transmit one or more instructions, tokens, keys, or any combination thereof to, from, or with the data processing system 110 via the user device(s) 170.

In some implementations, the data processing system 110 can execute and/or otherwise perform various operations, including retrieving, integrating, and/or processing data to facilitate node-based network access control or node-based resource validation. In some implementations, the data processing system 110 can include one or more subcomponents or systems to execute and/or otherwise perform various operations for to facilitate node-based network access control or node-based resource validation, such as one or more of the metadata I/O processor 112, token generator 114, protection processor 116, node generator 118, system memory 120, token storage 121, smart contract storage 122, node storage 123, graph storage 124, and ledger storage 125.

In some implementations, the data processing system 110 and/or the metadata I/O processor 112 can receive, from at least one computing device, a network access request including metadata corresponding with the at least one computing device. For example, the data processing system 110 and/or the metadata I/O processor 112 can receive and/or otherwise identify an onboarding or device registration request transmitted by user device(s) 170. In some examples, the network access request can include metadata associated with the request and/or requesting device, such as a device hardware identifier (e.g., a universally unique identifier (UUID), a media access control (MAC) address, or a trusted platform module (TPM) identifier) or a cryptographic key associated with the device (e.g., a public key of a key pair, a digital certificate, or an authentication token).

In some implementations, the network access request corresponds with accessing a protected network using the at least one computing device. For example, the data processing system 110 can receive a request to onboard or register a device on a provider institution network (e.g., protected network). That is, a protected network can include or refer to an enterprise-controlled infrastructure, a permissioned blockchain network, a zero-trust architecture (ZTA) implementation, or another system or network that enforces security or access control policies (e.g., restricts or grants access to networked functions and/or resources). That is, the protected network can include and/or refer to a decentralized physical infrastructure (DePin) network. For example, the DePin network can facilitate access control and/or resource management using decentralized authentication mechanisms, such as blockchain-based identity verification, cryptographic key attestations, and/or smart contract-based access controls. For example, the protected network can use identity verification, device compliance validation, and/or cryptographic proof-of-possession mechanisms to grant access to one or more network operations, services, or data associated with physical devices, systems, and/or objects (e.g., user devices, resource instruments, and so on) represented on the DePin network. The data processing system 110 can interact with the DePin network to register devices, verify permissions, and/or coordinate access to distributed infrastructure resources (e.g., user data, account data, exchange data, device data, resource data, or instrument data). In some implementations, responsive to onboarding and/or activation of a corresponding device and/or resource instrument, the user device(s) 170 can interact with the DePin network to perform operations and/or access to distributed infrastructure resources (e.g., node-related information).

In some implementations, the data processing system 110 and/or protection processor 116 can apply the metadata to a node model to cause the node model to generate a first node. For example, the data processing system 110 can input the metadata from the request into node generator 118, which can process the metadata using a node function to derive a structured node representation. In some implementations, the node generator 118 can apply a node function or deterministic function (e.g., hashing, encryption, encoding, or transformation function) to encode or format the first node. The generated first node can be associated with a particular entity, device, or resource, and can be linked with additional metadata, access parameters, or control structures for validation and network access control. The data processing system 110 can store the first node and/or information corresponding to the first node (e.g., metadata, identifiers, and/or addresses) in one or more of node storage 123, graph storage 124, and/or ledger storage 125.

In some implementations, the data processing system 110 and/or metadata I/O processor 112 can generate a metadata object including the metadata, and the metadata object can include one or more access parameters. For example, the access parameters can include and/or otherwise corresponding with permissions, rights, restrictions, conditions, attributes, and/or constraints for network access control and/or resource validation. For example, the access parameters can include access levels (e.g., administrator, standard user, guest, or system process), role-based attributes (e.g., employee, contractor, system administrator, external vendor, or privileged service), activation status (e.g., active, suspended, pending validation, revoked, or expired), references to related decentralized identifiers (DIDs) or linked nodes (e.g., parent-child relationships, account-based mappings, or entity-based associations), and/or cryptographic authentication data (e.g., key-pairs, passkey data, zero-knowledge proof attestations, multi-signature authorization requirements, or time-based authentication constraints). In some implementations, the data processing system can store the generated metadata object linked with the first node in one or more storage systems or ledgers (e.g., one or more of node storage 123, graph storage 124, and/or ledger storage 125).

In some implementations, the data processing system 110 and/or protection processor 116 can generate a control structure including a link to the metadata object. For example, the control structure can include a smart contract configured or structured to enforce operational rules and/or instructions governing interactions with the corresponding metadata object. For example, the control structure can include conditional execution logic (e.g., smart contract-based rules), permissions-based constraints (e.g., access control lists, role-based policies, or cryptographic signature requirements), and/or event-driven execution conditions (e.g., state transitions, verification triggers, or multi-signature approvals). In some implementations, the data processing system 110 and/or protection processor 116 can record, on a ledger, the control structure. For example, the control structure can be recorded and/or otherwise stored as a smart contract within a block of a decentralized blockchain ledger (e.g., ledger storage 125).

In some implementations, the data processing system 110 and/or the token generator 114 can generate, using the control structure, at least one token including a token identifier and corresponding with the metadata object, and the at least one token can be compatible with the control structure restricting outputs or updates of the metadata object. For example, the token identifier can include a reference string, cryptographic hash, or pointer linking the token with the metadata object and/or the control structure. For example, the data processing system 110 and/or the token generator 114 can generate or mint a dynamic non-fungible token (dNFT) structured to reference or encapsulate parameters, execution conditions, or verification states used by a corresponding control structure to restrict outputs (e.g., transmitting data, executing transactions, or granting access to network resources) and/or updates (e.g., modifying metadata fields, altering access conditions, or appending additional attributes) of the corresponding metadata objects. For example, the control structure can verify or validate attributes or parameters (e.g., fields) of the generated token to enforce access control policies, determine execution conditions, and/or restrict modifications to linked metadata objects.

In some implementations, the data processing system 110 and/or protection processor 116 can record, on the ledger, the token identifier. For example, the data processing system 110 can store the token identifier on ledger storage 125 (e.g., a blockchain-based ledger) to provide a reference to the generated token and/or corresponding metadata. In some implementations, recording the token identifier can include generating, recording, and signing a ledger entry with a transaction record associating the token identifier with the corresponding control structure and metadata object. In some implementations, the data processing system 110 and/or protection processor 116 can receive, from the at least one computing device, an output or update request including the first node and at least one request parameter. For example, a user device 170 can transmit an update request to modify a metadata object or request access to a protected network function or resource (e.g., validating a device and/or instrument, initiating a transaction, updating a stored credential, modifying an access policy, or executing a smart contract function). The output or update request can include the first node and/or information corresponding to the first node (e.g., a node identifier, cryptographic signature, or associated metadata) and one or more request parameters (e.g., an identifier or address of requested resource or function on the protected network, user authentication data, and so on). In some implementations, recording the token identifier can include generating and embedding a cryptographic proof (e.g., digital signatures, Merkle tree hashes, or zero-knowledge attestations) in a ledger record, token, and/or corresponding metadata object.

In some implementations, the data processing system 110 and/or protection processor 116 access, by interfacing with the control structure on the ledger, the metadata object by retrieving a metadata reference corresponding with the at least one token from the control structure and using the metadata reference to obtain the metadata object from an external storage system. For example, the control structure can include a reference or pointer (e.g., a hashed address, URI, decentralized identifier) that links the token to a metadata object stored externally (e.g., using a distributed storage system, an off-chain database, wallet system 172). The data processing system 110 can retrieve the metadata object using the reference and verify the integrity of the retrieved data by performing cryptographic validation (e.g., comparing a stored hash, verifying a digital signature, or checking an integrity proof). In some implementations, the data processing system 110 can decrypt an encapsulated metadata object, extract access parameters, and/or apply validation rules to determine to grant or restrict an update or output request.

In some implementations, the data processing system 110 and/or protection processor 116 can determine one or more network access rights or restrictions of the at least one computing device on the protected network using at least one of the one or more access parameters and the at least one request parameter. For example, the data processing system 110 can compare the request parameters against stored access parameters in the metadata object to determine authorization conditions (e.g., role-based access control (RBAC), policy-based conditions, cryptographic authentication requirements, or time-sensitive constraints). The data processing system 110 can analyze the request to determine the request satisfies predefined conditions (e.g., a requested operation aligns with permitted access levels, cryptographic signatures match stored authentication keys, or requested updates comply with policy constraints). In some implementations, the data processing system 110 can analyze relationships between the first node and linked nodes (e.g., parent-child structures, group-based permissions, or entity-based access hierarchies) to determine the network access rights or restrictions, as further described herein.

In some implementations, the data processing system 110 and/or protection processor 116 can provide or restrict access of the at least one computing device to one or more functions or resources of the protected network based on the one or more network access rights or restrictions. For example, the data processing system 110 can analyze the determined access rights or restrictions to generate an access decision output (e.g., an access grant token, a denial notification, or a conditional approval for additional authentication), and can transmit the output to the requesting device (e.g., user device(s) 170) and/or other systems, devices, and/or services associated with the protected network (e.g., DePin network). In response to determining access is granted, the data processing system 110 can initiate a corresponding network operation (e.g., executing a function, retrieving a resource, or updating a metadata object). In response to determining access is denied, the data processing system 110 can generate and/or store an alert (e.g., storing a rejection reason, timestamp, and request details) and provide the alert to one or more entities (e.g., users, administrators, monitoring systems, auditing services, and so on).

In some implementations, the data processing system 110 and/or protection processor 116 can determine a first node for an encoded object of a resource instrument based on metadata of the resource instrument. The encoded object can include and/or otherwise correspond with an encoded software or hardware element or item used by the resource instrument to perform exchanges and/or identify the resource instrument on a protected network. For example, the encoded object can include a machine-readable code generated for a restricted-usage instrument (e.g., a check), an embedded security chip (e.g., a secure element (SE) or trusted execution environment (TEE) chip of a transaction card), and/or a cryptographic identifier embedded in a device (e.g., a trusted platform module (TPM) signature, a secure enclave key, or an attestation record from a hardware security module (HSM)). The encoded object can encode and/or otherwise provide a first node corresponding with the resource instrument (e.g., a decentralized identifier). For example, the data processing system 110 can receive data or metadata corresponding with the resource instrument in response to scanning the encoded object using scanning device(s) 140 and receiving scanned data from the instrument system 150. That is, scanning device(s) 140 can extract the encoded data and transmit the extracted data to the data processing system 110 for processing. The data processing system 110 can decode, validate, and/or process the received data to identify and/or generate the first node. In some implementations, the first node can be used to link the resource instrument to one or more control structures, metadata objects, or tokenized representations used for resource validation.

In some implementations, the data processing system 110 and/or metadata I/O processor 112 can generate a metadata object including the metadata, and the metadata object can include at least one resource lifecycle indicator corresponding with a private state of the resource instrument on a protected network. For example, the data processing system 110 can encapsulate and/or store at least a portion of the metadata in a structured data object including one or more fields with information (e.g., indicators or parameters) associated with resource instrument. That is, the resource lifecycle indicator can include and/or provide a status of a corresponding resource instrument (e.g., active, pending activation, deactivated, or revoked) and/or usage condition associated with the resource instrument (e.g., single-use or restricted usage, multi-use or persistent usage). In some implementations, the data processing system 110 can associate the metadata object with the first node (e.g., via a control structure) and store the metadata object in one or more storage locations (e.g., a ledger). The data processing system 110 can generate or update the resource lifecycle indicator in response to detection of various conditions and/or events (e.g., activation of a resource instrument, revocation of an instrument, and so on).

In some implementations, the data processing system 110 and/or protection processor 116 can generate a control structure including a link to the metadata object. The control structure can include logic, conditions, execution policies, and/or verification parameters for handing output or update requests associated with the metadata object of the resource instrument. For example, the control structure can include instructions or logic that restrict or permit modifications to metadata associated with the resource instrument (e.g., permitting authorized entities to modify lifecycle indicators, using cryptographic verification for state transitions, or using multi-factor authentication). Additionally, the control structure can include execution conditions that trigger and/or otherwise cause performance of one or more actions associated with the resource instrument based on detected resource lifecycle states (e.g., automatically revoking permissions when a resource instrument expires).

In some implementations, the data processing system 110 and/or protection processor 116 can record, on a ledger, the control structure. For example, the data processing system 110 can store the control structure as an entry in ledger storage 125 (e.g., a blockchain-based ledger or distributed access control framework). The recorded control structure can include cryptographic references to metadata objects, access policies defining permissions or restrictions for resource interactions, and/or other conditions or parameters used for output or update validation. In some implementations, the data processing system 110 and/or the token generator 114 can generate, using the control structure, at least one token including a token identifier and corresponding with the metadata object, and the at least one token can be compatible with the control structure restricting outputs or updates of the metadata object. For example, the data processing system 110 can generate a dynamic non-fungible token (dNFT) encoding attributes of the resource instrument linked to the control structure (e.g., associated accounts, permissions, expiration conditions, or execution triggers). In some implementations, the data processing system 110 and/or protection processor 116 can record, on the ledger, the token identifier. For example, recording the token identifier on the ledger can include the data processing system 110 generating a transaction entry within ledger storage 125 that associates or links the token identifier with the corresponding metadata object and/or control structure. The ledger entry can include cryptographic verification data, such as a hash of the token identifier or a signed transaction record generated by using a public-private key pair corresponding to the generated node.

In some implementations, the data processing system 110 and/or protection processor 116 can receive, from at least one scanning device or instrument system using the encoded object of the resource instrument, an update or output request including at least the first node. For example, an instrument system 150 can scan the encoded object of a resource instrument (e.g., a check, transaction card, or secure device) to decode and identify a first node, and can further transmit an update or output request including the first node to the data processing system 110. The update or output request further include one or more request parameters (e.g., recipient nodes or accounts, request types, cryptographic signatures, transaction data such as a transaction amount, biometric data, or multi-factor authentication credentials). In some implementations, the data processing system 110 can process the request by referencing and/or identifying the recorded control structure and validating that the request satisfies one or more conditions or parameters (e.g., the first node being associated with an active instrument, the request originating from an authorized entity, or the requested operation complying with protected network policies, and so on).

In some implementations, the data processing system 110 and/or protection processor 116 can access, by interfacing with the control structure on the ledger, the metadata object by retrieving a metadata reference corresponding with the at least one token from the control structure and using the metadata reference to obtain the metadata object from an external storage system. A metadata reference can include or refer to an identifier, address, hash value, or pointer associated with a metadata object stored in an external storage system. For example, the data processing system 110 can identify a stored reference within the control structure (e.g., a hash, pointer, or identifier) that maps to an address or identifier used by an external storage system to manage storage of the metadata object. For example, the data processing system 110 can execute a query using the metadata reference to cause the external storage system (e.g., distributed ledger storage, an off-chain database, or a protected user wallet) to provide at least a portion of metadata stored in the metadata object. For example, responsive to the update or output request, the data processing system 110 can retrieve or identify the resource lifecycle indicator included in the metadata object corresponding to first node included in the request.

In some implementations, the data processing system 110 and/or protection processor 116 can identify the private state of the resource instrument on the protected network based on the at least one resource lifecycle indicator. For example, the data processing system 110 can analyze state attributes of the metadata object (e.g., activation status, operational mode, expiration conditions, or compliance verification parameters) to determine to permit or restrict output or update requests corresponding with the resource instrument (e.g., a request to convert assets or resources of a restricted-usage instrument into account assets or resources or a request to execute a transaction using a persistent-usage instrument or digital instrument). That is, a private state can include and/or otherwise correspond with a classification or operational condition of the resource instrument on the protected network (e.g., DePin network) based on a corresponding lifecycle state, transaction history, or validation status. For example, the private state can indicate the resource instrument is active and available for transactions, restricted based on policy constraints, pending additional verification, suspended due to security concerns, and/or decommissioned due to expiration or revocation events.

In some implementations, the data processing system 110 and/or protection processor 116 can transmit, to the at least one scanning device or instrument system, at least one of a confirmation or a status alert including an indication of the private state. For example, the data processing system 110 can generate and transmit a response or notification including a confirmation of successful validation, a conditional approval, or an alert indicating restrictions or corrective actions based on the identified private state. In response to receiving a success confirmation, the data processing system 110 can permit the update or output request by initiating one or more network operations on the protected network (e.g., updating a transaction record, modifying a resource allocation, executing a smart contract function, or granting access to a secured resource). In response to detecting an error or restriction condition, the data processing system 110 can deny the request, log the rejection event, and/or generate a remediation action (e.g., requesting additional authentication, triggering a revalidation process, or notifying an administrator for manual review).

Figure 2:
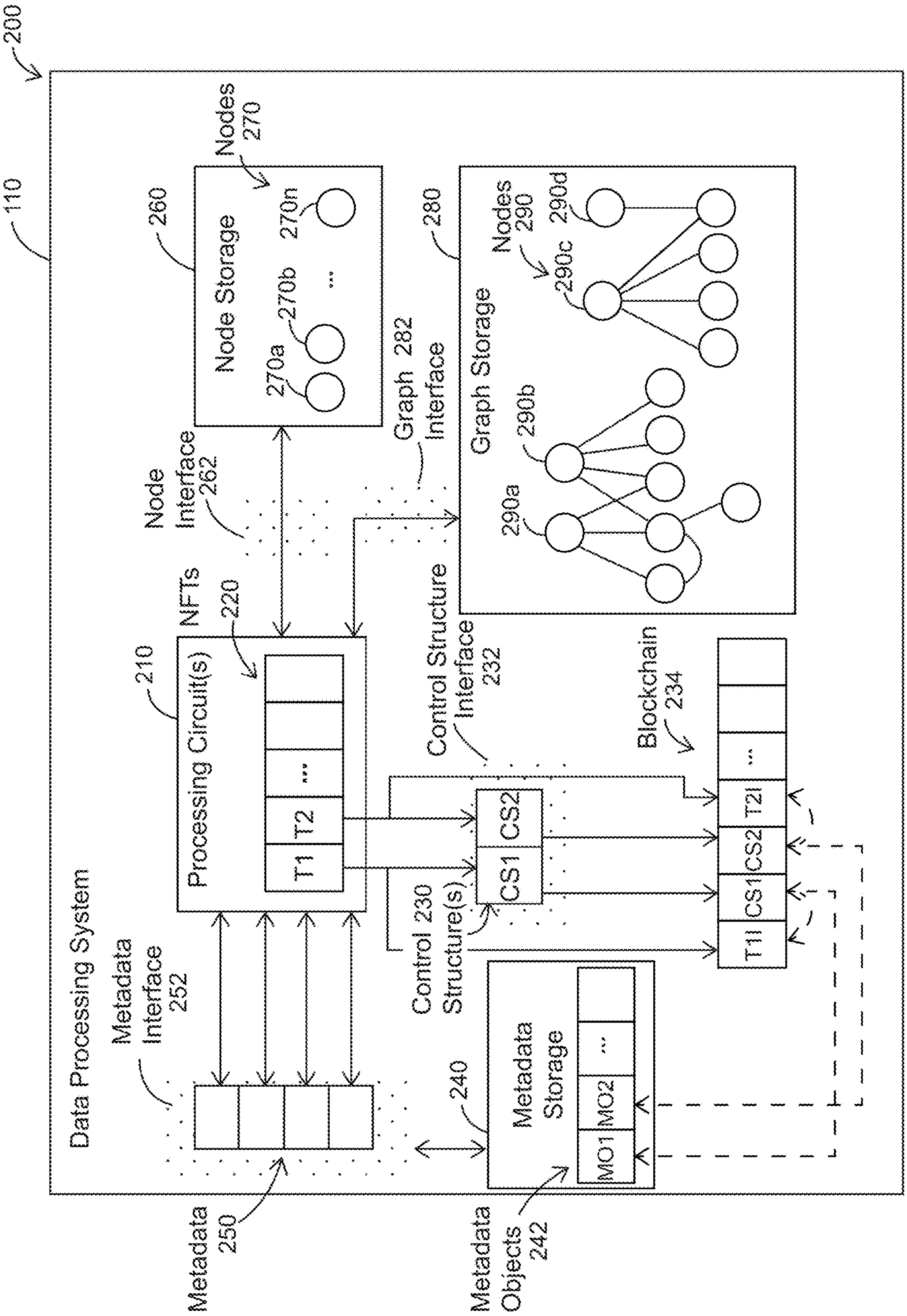
FIG. 2 depicts a block diagram of an example system, according to some implementations.

Referring now to FIG. 2, an example system 200 is shown, according to some implementations. As illustrated by way of example in FIG. 2, the example system 200 can include data processing system 110, which can include processing circuit(s) 210 configured to execute and/or perform various operations associated with non-fungible tokens (NFTs) 220. For example, the processing circuit(s) 210 can interact with control structure(s) 230 associated with one or more NFTs 220 using a control structure interface 232. The control structure interface 232 can configured and/or structured to interact with a blockchain 234, which can include one or more blocks storing data associated with NFTs 220. For example, the blockchain 234 can store data of one or more metadata objects 242 (e.g., associated with NFTs 220) of metadata storage 240. In some implementations, the processing circuit(s) 210 can access metadata 250 associated with the NFTs 220 using metadata interface 252. Further, the processing circuit(s) 210 can access one or more nodes 270 associated with the NFTs 220 stored in node storage 260 using node interface 262, and can access one or more graph nodes 290 stored in graph storage 280 using graph interface 282.

In some implementations, the data processing system 110 can generate and/or identify one or more NFTs 220. For example, the processing circuit(s) 210 can generate an NFT 220 by processing metadata associated with a resource instrument, user credential, or digital asset and encoding attributes within a structured token format. In some examples, generating an NFT 220 can include associating a generated token with an identifier that references a corresponding metadata object and/or links the token to one or more control structures 230. That is, the data processing system 110 can generate a token identifier and encode token attributes (e.g., ownership data, cryptographic signatures, permissions, usage history) into an NFT structure. For example, the token "T1" can be associated with a node 270*a*, and the token "T2" can be associated with the node 270*n*. In some examples, although the NFTs 220 can be depicted as internal to the data processing system 110, the NFTs 220 can be external to and/or remote from the data processing system 110 (e.g., the NFTs 220 can be stored in a user wallet system of a customer or employee device). That is, the NFTs 220 can be stored using the data processing system 110, blockchain 234, and/or an external storage system.

In some implementations, the NFTs 220 can correspond and/or otherwise be linked with control structure(s) 230. In some examples, the control structure interface 232 can be configured and/or structured to provide access to stored control structure(s) 230. For example, the data processing system 110 can associate a token "T1" with a first control structure "CS1" and a token "T2" with a second control structure "TS2" using the control structure interface 232. As used herein, a "smart contract control structure," "metadata control structure," and "control structure" can be a computer program (also known as a program, software, software application, script, or code) configured output, append, or update metadata objects of one or more tokens (e.g., NFTs 220) to include one or more metadata, references, attributes, conditions (e.g., smart contracts), fields, values, and so on. For example, a control structure 230 can be written in any form of programming language, including compiled or interpreted languages, and/or declarative or procedural languages, and can be deployed in any form, including as a stand-alone program or as a circuit, component, subroutine, object, or other unit suitable for use in a computing environment. A control structure 230 can be deployed to be executed on one computer or on multiple computers that are located at one site or distributed across multiple sites and interconnected by a communication network. In some implementations, the processes and logic flows described herein can be performed by one or more programmable processors executing one or more control structures 230 (or computer programs) to perform actions by operating on input data (e.g., metadata 250 of metadata objects 242).

In some implementations, the data processing system 110 can interface with the blockchain 234 to store and/or record data. For example, the processing circuit(s) 210 can store a first token identifier "TI1" associated with the token "T1," the first control structure, a second token identifier "TI2" associated with the token "T2," and/or the second control structure in one or more blocks of the blockchain 234. That is, the token identifiers can be linked with corresponding control structures 230 recorded on blockchain 234, and the control structures 230 can be linked with corresponding metadata objects 242 stored external from the blockchain 234. In some examples, the data processing system 110 can generate or modify links between various nodes, control structures, metadata, and/or tokens using blockchain 234. For example, the blockchain 234 can include a blockchain operated and controlled at the data processing system 110 and/or externally from the data processing system 110. In some implementations, the blockchain 234 can include a decentralized ledger to record transactions and interactions corresponding with the data processing system 110. For example, the blockchain 234 can be used to provide transparency of data within the data processing system 110 and reducing the risk of tampering and fraud by immutably storing data associated with nodes, control structures, metadata, and/or tokens within blocks of the blockchain 234 for subsequent retrieval and/or verification.

In some implementations, the data processing system 110 can interact with the metadata storage 240 to retrieve, generate, and/or update one or more metadata objects 242. A metadata object 242 can include a structured data object that stores descriptive information about characteristics and/or a state of a corresponding token. For example, processing circuit(s) 210 can use an interface to identify and/or update a metadata object (e.g., "MO1" or "MO2") stored in the metadata storage 240 and corresponding to a control structure (e.g., first control structure "CS1" or second control structure "CS2," respectively) recorded on the blockchain 234. In some examples, although the metadata storage 240 can be depicted as internal to the data processing system 110, the metadata storage 240 can be external to and/or remote from the data processing system 110 (e.g., the metadata storage 240 can include a user wallet system of a customer or employee device). In some implementations, a metadata object 242 can correspond to a file in a file system. That is, a metadata object 242 can be stored in a portion of a file that holds other programs or data (e.g., one or more scripts stored in a markup language document), in a single file dedicated to a token in question, or in multiple coordinated files (e.g., files that store one or more subsystems, sub-programs, or portions of code). In some examples, the metadata objects 242 can include metadata 250 (e.g., access parameters, references, and/or other state data or attributes) associated with nodes 270.

In some implementations, the data processing system 110 can interact with metadata 250 associated with the metadata objects 242 using the metadata interface 252. For example, the processing circuit(s) 210 can identify, analyze, and/or update metadata 250 using the metadata interface 252. For example, the data processing system 110 can use metadata interface 252 to retrieve stored attributes linked to a given token, such as associated references, lifecycle parameters, and/or stored conditions used for determining access rights or restrictions. For example, the data processing system 110 can access metadata 250 to determine an NFT 220 is associated an access parameter and/or operational attribute (e.g., a usage restriction) in response to an output or update request associated with control structure(s) 230.

In some implementations, the data processing system 110 can interact with node storage 260 and/or nodes 270 using a node interface 262. That is, node interface 262 can facilitate identification, retrieval, and/or processing of information related to stored nodes 270 (e.g., decentralized identifiers). For example, in response to a request (e.g., network access request, update request, or output request) the data processing system 110 can use node interface 262 to identify and/or determine a stored node 270 corresponding with a user, device, account, instrument, and/or resource associated with initiating the request. For example, the data processing system 110 can query node storage 260 to determine a decentralized identifier (DID) linked to an NFT 220 and determine the node 270 corresponds with a registered user, device, account, instrument, and/or resource on the protected network. That is, node interface 262 can apply a lookup operation or structured query to node storage 260 and determine relationships (e.g., data associations) between nodes 270 based on stored information in node storage 260.

In some implementations, the data processing system 110 can interact with graph storage 280 and/or graph nodes 290 using graph interface 282. For example, graph storage 280 can include and/or store any data representation and/or data structure (e.g., a graph, a tree, a linked list, a key-value store, a relational table, an object-based model) configured and/or structured to organize relationships between data elements. That is, graph storage 280 can include a knowledge graph storing hierarchical data associated with one or more graph nodes 290. In some examples, one or more of the graph nodes 290 can correspond to one or more nodes 270 of the node storage 260. In some examples, the data processing system 110 can use graph interface 282 to traverse stored graph structures and identify contextual relationships between users, accounts, devices, and/or instruments represented by graph nodes 290. For example, graph node 290*a* can include a primary node representing an account of a customer with a provider institution, and the graph node 290*a* can be linked with a secondary node representing a device, resource, and/or additional account associated with the account of the customer. For example, graph node 290*b* can include a primary node representing an employee profile and can be linked with corresponding graph nodes representing devices, instruments, and/or other accounts associated with the employee profile.

As illustrated on FIG. 2, primary nodes and/or secondary nodes can be associated via direct edges (e.g., an edge connecting two nodes without an intermediate connection) and/or indirect edges (e.g., via a connection including two or more edges connected to an intermediate node). That is, the graph node 290*a* and the graph node 290*b* can be associated by sharing a common secondary node representing a device, resource, instrument, and/or other information corresponding with both the graph node 290*a* and the graph node 290*b* (e.g., where the secondary node represents a device linked with multiple user accounts). In some examples, the graph node 290*c* can include a primary node representing a user account, and the node 290*d* can include a secondary node corresponding with a resource instrument associated with the user account. Further, the graph node 290*c* and the graph node 290*d* can be associated via a shared or common secondary node. For example, the shared or common secondary node can represent a device authenticated to perform operations associated with the account of the graph node 290*c* and/or using the resource instrument associated with the graph node 290*d*. In some implementations, the data processing system 110 can process a request corresponding with an NFT 220 by traversing one of more of the graph nodes 290*a*-290*d* to determine inherited attributes and/or other metadata associated with one or more of the NFTs 220.

Figure 3:
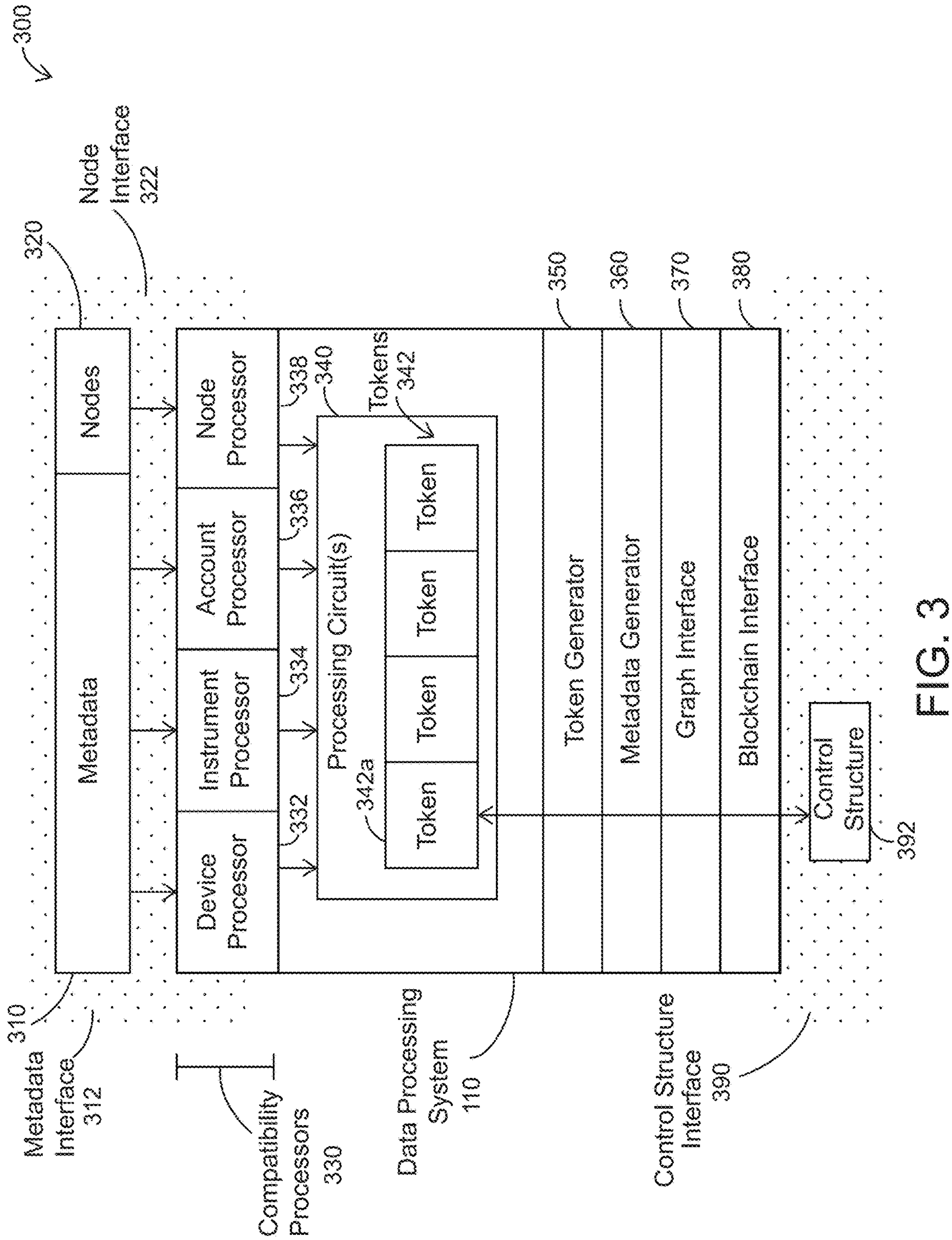
FIG. 3 depicts a block diagram of an example system, according to some implementations.

Referring now to FIG. 3, an example system 300 is shown, according to some implementations. As illustrated by way of example in FIG. 3, the example system 300 can include data processing system 110, which can interact with metadata 310 via a metadata interface 312 and/or nodes 320 using a node interface 322. The data processing system 110 can include one or more compatibility processors 330 configured to identify and/or access metadata 310 and/or nodes 320, including a device processor 332, an instrument processor 334, an account processor 336, and a node processor 338. The data processing system 110 can include processing circuit(s) 340 configured to interact with the compatibility processors 330 to execute and/or perform various operations associated with tokens 342. For example, the processing circuit(s) 340 can interact with (e.g., access, retrieve, analyze, generate, or update) tokens 342 using a token generator 350, metadata generator 360, graph interface 370, and/or blockchain interface 380. In some implementations, the processing circuit(s) 340 can generate and/or update a control structure 392 corresponding to the token 342*a* using a control structure interface 390.

The compatibility processors 330, including the device processor 332, instrument processor 334, account processor 336, and/or node processor 338, can detect a presence of metadata 310 and/or nodes 320 and can retrieve and/or detect corresponding data using a compatibility processor compatible with metadata 310 and/or nodes 320. The detection can be responsive to an action by the metadata interface 312 and/or node interface 322 to transmit metadata 310 and/or nodes 320 to the data processing system 110. The metadata interface 312 and/or node interface 322 can include a communication channel between one or more of the data processing system 110 and stored metadata, metadata objects, and/or nodes corresponding to tokens 342. In some implementations, the metadata interface 312 and/or node interface 322 can include an application programming interface compatible with the data processing system 110 and/or control structure 392.

In some implementations, the device processor 332 can identify and/or access metadata 310 corresponding with one or more user devices using the metadata interface 312. That is, the device processor 332 can retrieve hardware and/or software information, device identifiers, security attributes, and/or operational parameters associated with a user device. For example, in response to a request (e.g., network access request, output request, or update request) from a user device, the data processing system 110 can use the metadata interface 312 to access metadata 310 indicated by the request and/or associated with the user. In some examples, device processor 332 can determine and/or analyze the metadata 310 to generate and/or identify one or more tokens 342 associated with the user device.

In some implementations, the instrument processor 334 can identify and/or access metadata 310 corresponding with a resource instrument using the metadata interface 312. That is, the instrument processor 334 can retrieve attributes, conditions, parameters, indicators, and/or other operational data associated with a resource instrument. For example, in response to an output or update request using the resource instrument, the data processing system 110 can use the metadata interface 312 to retrieve metadata 310 that includes a resource type, expiration date, spending limit, transaction history, authentication data, and/or geographic restriction associated with the resource instrument. For example, the instrument processor 334 can analyze metadata 310 to determine a resource instrument corresponds with a persistent-usage instrument (e.g., a physical or digital payment card, wallet credential, or access badge) or a restricted-usage instrument (e.g., a physical or digital single-use voucher or check). In some examples, instrument processor 334 can determine and/or analyze the metadata 310 to generate and/or identify one or more tokens 342 associated with the resource instrument.

In some implementations, the account processor 336 can identify and/or access metadata 310 corresponding with one or more user accounts using the metadata interface 312. That is, the account processor 336 can retrieve stored attributes, permissions, role-based access controls, transaction limits, and/or authentication parameters associated with an account. For example, in response to an access request, output request, or update request corresponding with a user account, the data processing system 110 can use the metadata interface 312 to retrieve metadata 310 that includes account information such as linked resource instruments and/or devices, security parameters, historical data, and/or authorization data associated with the user account. In some implementations, the account processor 336 can determine and/or identify metadata 310 corresponding with an individual account (e.g., a personal financial account, customer account, employee profile) or an organizational account (e.g., a business account or administrator profile). For example, the account processor 336 can analyze metadata 310 to determine a requested operation is permitted based on conditions and/or controls associated with the account. In some examples, account processor 336 can determine and/or analyze the metadata 310 to generate and/or identify one or more tokens 342 associated with an account.

In some implementations, the node processor 338 can identify and/or access nodes 320 using the node interface 312. That is, the node processor 338 can retrieve and/or process decentralized identifiers (DIDs), cryptographic references, network relationships, and/or associated metadata linked with nodes 320. For example, in response to an update or output request, the data processing system 110 can use the node interface 312 to retrieve a DID (e.g., one or more nodes 320) associated with a resource instrument, device, or user account, and can use the metadata interface 312 to access corresponding metadata 310. In some examples, the node processor 338 can determine and/or analyze nodes 320 to generate and/or identify one or more tokens 342 linked to a given node. That is, the node processor 338 can process node attributes to determine to generate and/or modify a tokenized representation (e.g., a tokenized account, device, or resource instrument).

In some implementations, the processing circuit(s) 340 can execute and/or perform various operations associated with tokens 342. While the tokens 342 are depicted on FIG. 3 as internal to the data processing system 110 and/or processing circuit(s) 340, it should be understood that the tokens 342 can be external from the data processing system 110 and/or processing circuit(s) 340 (e.g., stored in a user wallet). In some examples, the processing circuit(s) 340 can identify and/or generate tokens 342 based on data or information provided by the compatibility processors 330. For example, the processing circuit(s) 340 can identify and/or generate token 342*a* by retrieving node data using the node interface 312, processing linked metadata 310, and encoding references to account, device, or resource attributes within the token structure. That is, the processing circuit(s) 340 can determine token properties based on stored metadata and/or control conditions associated with a corresponding node 320. In some implementations, the processing circuit(s) 340 can associate a generated token with a decentralized identifier by linking the token with a corresponding control structure.

In some implementations, the token generator 350 can one or more tokens (e.g., fungible or semi-fungible tokens, asset tokens, and so on) in accordance with metadata 310 and/or nodes 320 obtained at the compatibility processors 330. For example, the token generator 350 can generate tokens 342 linked with a particular smart contract control structure with which the respective token is compatible. That is, the token 342*a* can be linked with the control structure 392. In some examples, the token generator 350 can generate and/or mint one or more NFTs in accordance with metadata 310 and/or nodes 320 obtained at the compatibility processors 330. In some examples, the token generator 350 can generate a corresponding number of keys used to validate and/or update a particular metadata object linked with the particular smart contract control structure compatible with the particular token.

In some implementations, the metadata generator 360 can generate one or more metadata objects in accordance with metadata 310 and/or nodes 320 obtained at the compatibility processors 330. For example, metadata generator 360 can generate multiple tokens 342 based on a number of new metadata objects or tokens indicated by obtained metadata 310 and/or nodes 320 and linked the tokens 342 with respective smart contract control structures. For example, the metadata generator 360 can generate one or more metadata objects linked with a particular smart contract control structure by which the respective metadata object is controlled. In some examples, the metadata generator 360 can modify, delete, and/or otherwise update metadata objects linked with tokens or smart contract control structures. For example, the metadata generator 360 can modify a quantitative value, state-based parameters, or other field of a metadata object corresponding to a token.

In some implementations, the graph interface 370 can facilitate interaction between the data processing system 110 and graph storage 280. That is, the data processing system 110 can use the graph interface 370 to retrieve, update, and/or analyze structured relationships between graph nodes 290 corresponding with accounts, devices, and/resource instruments. For example, the data processing system 110 can use the graph interface 370 to identify access relationships between a user account and one or more linked resource instruments or devices, determine authorization conditions, and/or update node relationships to reflect changes in permissions or ownership. In some implementations, the data processing system 110 can use the graph interface 370 to determine conditions applicable to a request. For example, the data processing system 110 can use the graph interface 370 to identify an account node linked to a resource instrument and retrieve usage restrictions stored in metadata associated with the account node in response to a transaction request (e.g., output request) using the resource instrument. In some implementations, the graph interface 370 can be used to update relationships between graph nodes 290 based on detected events. For example, the data processing system 110 can update graph storage 280 to establish a new link (e.g., an edge) between an account node and a device node in response to an enrollment event (e.g., registering a new device).

In some implementations, the blockchain interface 380 can include an API compatible with a blockchain registry via the control structured interface 390. That is, the data processing system 110 can use the blockchain interface 380 to selectively add, modify, and delete blocks from a blockchain registry. For example, the blockchain interface 380 can add, modify, and delete blocks in accordance with restrictions or interfaces of the corresponding blockchain registry, and can add, modify, and delete blocks independently of the restrictions or interfaces of the blockchain registry at any portion or index of the blockchain registry. That is, the data processing system 110 can use the blockchain interface 380 to retrieve, append, and/or update blocks storing data corresponding to one or more nodes 320 and/or tokens 342 (e.g., control structure 392).

In some implementations, the control structure interface 390 can facilitate interaction between the data processing system 110 and control structure(s) 392. That is, the data processing system 110 can use the control structure interface 390 to access, retrieve, modify, and/or enforce conditions stored within a control structure 392 linked to a token 342*a*. For example, the control structure interface 390 can retrieve, update, and/or cause execution of instructions or logic of the control structure 392 based on access conditions, transaction rules, or role-based permissions associated with a node 320 corresponding with the token 342*a*. For example, in response to detecting an event corresponding with a smart contract condition, the data processing system 110 can use the control structure interface 390 to execute a control operation such as updating an access status, triggering an event, and/or modifying linked metadata. In some implementations, the control structure interface 390 can process input data and/or updates to the control structure 392 to enforce changes in ownership, usage restrictions, or transactional permissions associated with a corresponding token.

In some implementations, the control structure 392 can be linked with a respective token 342*a* of the tokens 342. That is, the control structure 392 can store execution logic, condition parameters, and/or access rules governing operations associated with the corresponding token 342*a*. For example, the data processing system 110 can retrieve control structure 392 in response to an update or output request associated with the token 342*a* and apply corresponding execution conditions to identify network access rights and/or restrictions associated with a node 320 corresponding with the token 342*a*. In some implementations, the control structure 392 can include references, encoded logic, and/or conditions for interacting with a metadata object corresponding with token 342*a*. For example, the data processing system 110 can use control structure 392 to modify metadata and/or objects storing access parameters, attributes, and/or conditions associated with a node 320 corresponding with the token 342*a*. In some implementations, the control structure 392 can be dynamically updated based on detected events and/or conditions (e.g., an enrollment event, an authentication event, or a metadata update).

Figure 4:
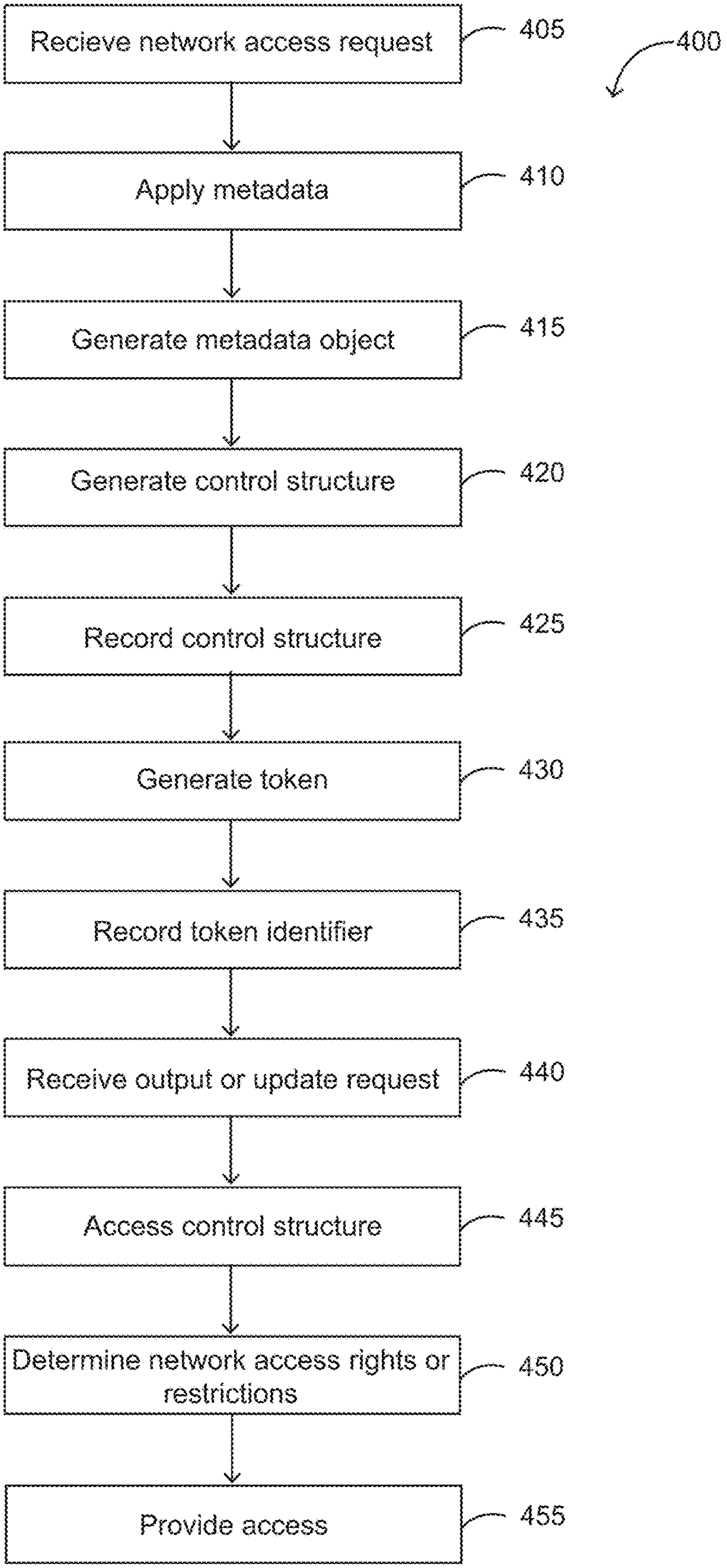
FIG. 4 depicts a flowchart diagram of an example method for node-based network access control, according to some implementations.

Referring now to FIG. 4, a flowchart diagram of an example method 400 for node-based network access control is shown, according to some implementations. At least one of the example systems of FIG. 1, FIG. 2, FIG. 3, and/or FIG. 6 can perform method 400 according to present implementations. In some implementations, additional, fewer, or different operations can be performed in method 400 depending on the implementation. In some implementations, some, or all operations of method 400 can be performed by one or more processors executing on one or more computing devices, systems, or servers. In various implementations, at least one operation can be re-ordered, added, removed, or repeated. Additionally, some or all of the operations performed by the blocks can be removed or added.

In broad overview of method 400, at block 405, one or more processors (e.g., data processing system 110) can receive a network access request. At block 410, the one or more processors can apply metadata. At block 415, the one or more processors can generate a metadata object. At block 420, the one or more processors can generate a control structure. At block 425, the one or more processors can record the control structure. At block 430, the one or more processors can generate a token. At block 435, the one or more processors can record a token identifier. At block 440, the one or more processors can receive an output or update request. At block 445, the one or more processors can access a control structure. At block 450, the one or more processors can determine one or more network access rights or restrictions. At block 455, the one or more processors can provide access.

At block 405, one or more processors (e.g., data processing system 110) can receive and/or otherwise identify a network access request. For example, block 405 can include receiving, by one or more processors, from at least one computing device, a network access request including metadata corresponding with the at least one computing device. For example, the network access request can include a device onboarding request (e.g., an initialization or registration request for registering a previously unregistered computing device within an access-controlled or protected network), an enrollment request (e.g., a request to associate a decentralized identifier with a verified user account and/or device profile), and/or a network authentication request (e.g., a request including authentication parameters for establishing a secure communication session or networked functions and/or resources). In some examples, network access request can include a data payload (e.g., a serialized object, an encoded bitstream, a cryptographic message format) transmitted to the data processing system 110 using a request-response protocol or a message-queuing system. Additionally, the metadata included in the network access request can include device attributes (e.g., a hardware identifier, a firmware version, an operational state), security parameters (e.g., a passkey-based signature, an encrypted authentication token, a challenge-response credential), and/or contextual access parameters (e.g., a timestamp, a geolocation) corresponding with the at least one computing device.

In some implementations, the network access request received at block 405 can correspond with accessing a protected network using the at least one computing device. For example, a protected network can include and/or otherwise correspond with various networked functions (e.g., transaction services, account management services, and/or security services) and/or resources (e.g., systems, applications, instruments, assets, and/or data) facilitated by a provider institution. That is, a protected network can include and/or provide networked applications, APIs or endpoints, databases, and/or other access-restricted functions or resources associated with physical devices and/or resources in response to performing authentication and/or authorization protocols (e.g., a DePin network). For example, receiving the network access request can include data processing system 110 receiving data transmitted from an application and/or another access point executed using the at least one computing device (e.g., a provider-specific application, a web-based authentication client, a secure API request). The data processing system 110 can parse the request payload to extract metadata (e.g., device attributes, cryptographic credentials, session identifiers) and determine the request corresponds with an unregistered or a previously registered computing device. In response to determining the computing device is unregistered, data processing system 110 can generate an identifier, initialize access parameters, and associate the device with other data (e.g., an account) on the protected network. In response to determining the computing device is registered, data processing system 110 can retrieve stored authentication records, validate the request against access policies, and/or grant, deny, or restrict network access based on a validation result.

At block 410, the one or more processors can apply and/or otherwise provide metadata. For example, block 410 can include applying, by the one or more processors, the metadata to a node model to cause the node model to generate a first node. That is, the one or more processors can process the metadata by executing a deterministic function (e.g., applying a cryptographic hash to generate an identifier, encoding structured data into a registry-compliant format, deriving a hierarchical identifier based on namespace rules). The one or more processors can structure the first node based on attributes associated with the metadata (e.g., device identifiers, authentication credentials, contextual parameters) and can associate the first node with additional network-related data (e.g., ledger references, stored access parameters, linked entity identifiers). In some examples, the one or more processors can store the first node in a decentralized identifier registry, append the first node to a distributed ledger, or incorporate the first node into a structured data graph that represents relationships between associated entities (e.g., user accounts, registered devices, policy constraints).

At block 415, the one or more processors can generate and/or otherwise identify a metadata object. For example, block 415 can include generating, by the one or more processors, a metadata object including the metadata, wherein the metadata object includes one or more access parameters. That is, data processing system 110 can format the metadata into a structured data object (e.g., a key-value mapping, an encoded attribute set, a hierarchical record) by encoding metadata fields and associating them with network operations or access conditions. In some implementations, block 415 can include identifying a metadata object. For example, the data processing system 110 can identify an existing metadata object associated with a node by querying a graph-based storage system and/or distributed ledger. In some examples, data processing system 110 can link the metadata object to a token (e.g., a cryptographic token, a digital record, an identifier stored in a ledger), as further described herein. Additionally, data processing system 110 can store the metadata object in a repository (e.g., a ledger, an identifier registry, a graph-based storage system), update the metadata object based on network events (e.g., authentication changes, device revocations, policy updates), and reference the metadata object during authentication or validation processes. For example, data processing system 110 can retrieve the metadata object to verify a device registration request, determine compliance with access policies, or validate a network operation.

At block 420, the one or more processors can generate and/or use a control structure. For example, block 420 can include generating, by the one or more processors, a control structure including a link to the metadata object. That is, data processing system 110 can generate a smart contract configured to enforce access conditions and govern interactions with the metadata object. In some implementations, block 420 can include using a control structure. For example, the data processing system 110 can identify and/or retrieve an existing smart contract associated with a metadata object by querying a blockchain registry and execute commands and/or instructions defined by the retrieved smart contract. In some examples, data processing system 110 can structure the smart contract to define execution logic (e.g., conditional access rules, authentication validation steps, role-based restrictions) and encode references to associated metadata objects. Additionally, data processing system 110 can store the control structure in a ledger, retrieve the control structure in response to an access request, and apply execution parameters to determine permissions or restrictions for network operations. For example, data processing system 110 can process the control structure to determine a request satisfies predefined conditions, to restrict unauthorized modifications, and/or enforce network policies during an authentication event.

At block 425, the one or more processors can record the control structure. For example, block 425 can include recording, by the one or more processors, on a ledger, the control structure. That is, data processing system 110 can generate a ledger entry containing the control structure and commit the entry to a persistent and/or append-only storage system (e.g., a blockchain registry or ledger). In some examples, data processing system 110 can serialize the control structure (e.g., encoding in a structured format, applying cryptographic hashing, assigning a ledger-specific key) and store the serialized representation as a transaction payload on a blockchain registry. Additionally, data processing system 110 can compute a cryptographic proof (e.g., a Merkle root, a digital signature, a zero-knowledge proof) and associate the proof with the ledger entry to verify the integrity of the recorded control structure. For example, data processing system 110 can retrieve and/or interface with a previously recorded control structure by querying the ledger using data (e.g., an identifier) corresponding with the recorded control structure.

At block 430, the one or more processors can generate a token. For example, block 430 can include generating, by the one or more processors, using the control structure, at least one token including a token identifier and corresponding with the metadata object. That is, the token can include a dynamic non-fungible token (dNFT) generated by embedding a reference to the metadata object within a data structure to bind the token to execution constraints defined by the control structure (e.g., access parameters corresponding with permitted network operations, authentication conditions, expiration triggers). In some examples, generating the token can include generating a digital signature to authenticate the association between the token and the metadata object, and the digital signature can be verified to determine a validity of the corresponding metadata referenced by the token. For example, in response to authenticating the token, the data processing system 110 can use the token to retrieve access parameters (e.g., first node, a device identifier, linked account data) or other metadata stored in the metadata object. In some implementations, the at least one token can be compatible with the control structure restricting outputs or updates of the metadata object. For example, restricting outputs of the metadata object can include evaluating the token against conditions in the control structure before outputting or providing the metadata for various operations (e.g., for protected network function and/or resource access). For example, restricting updates of the metadata object can include evaluating the token against conditions in the control structure to determine that modifications (e.g., metadata updates) are permitted or restricted.

At block 435, the one or more processors can record a token identifier. For example, block 435 can include recording, by the one or more processors, on a ledger and/or other data source, the token identifier. For example, recording the token identifier can include the data processing system 110 identifying or computing a deterministic value (e.g., a cryptographic hash of the token, a registry-mapped identifier, a structured reference) that corresponds with an entry (e.g., stored token) in an external storage system and recording the deterministic value on a blockchain registry. That is, the token identifier can include a value or reference used by data processing system 110 to retrieve information corresponding with the token by querying a storage system (e.g., blockchain registry, graph-based storage system, database, etc.) using the recorded token identifier as a lookup key. For example, data processing system 110 can retrieve the token identifier from the ledger in response to an access request and use the token identifier to locate the corresponding token (e.g., in an external storage system or on the ledger). Further, the data processing system 110 can interface with the token to retrieve the metadata reference stored in the control structure and access to the metadata object from an external storage system, as further described herein.

At block 440, the one or more processors can receive an output or update request. For example, block 440 can include receiving, by the one or more processors, from at least one computing device, an output or update request including the first node and at least one request parameter. That is, data processing system 110 can receive a data retrieval request (e.g., a request to check an account balance, retrieve recent transaction history, access stored authentication settings) or a data modification request (e.g., a request to perform a transaction, update a linked payment method, modify transaction limits, change account settings, access an employee application) that includes the first node and one or more parameters indicating operations or resources associated with the request. For example, the request parameters can include transaction data (e.g., a payment amount, a destination account identifier, a transaction category), contextual data (e.g., a validity period, a geographic restriction), and/or authentication data (e.g., a digital signature, a challenge-response credential, a token) used by the data processing system 110 to determine a requested network function and/or resource. In some examples, the first node can include the decentralized identifier generated for the computing device submitting the output or update request.

At block 445, the one or more processors can access and/or otherwise identify a control structure. For example, block 445 can include accessing, by the one or more processors, the control structure recorded on the ledger to retrieve a metadata reference associated with at least one token. That is, data processing system 110 can query the ledger using the token identifier to locate the corresponding token and retrieve the metadata reference stored within the control structure. In some examples, retrieving the metadata reference can include executing a function of the control structure (e.g., invoking a smart contract operation) to return a stored reference (e.g., a URI, an identifier mapped to off-chain storage, a cryptographic commitment). Data processing system 110 can then use the metadata reference to request the metadata object from an external storage system. For example, in response to receiving an access request, data processing system 110 can verify the token identifier, retrieve the associated token, query the control structure to obtain the metadata reference, and use the metadata reference to obtain the metadata object.

At block 450, the one or more processors can determine one or more network access rights or restrictions. For example, block 450 can include determining, by the one or more processors, one or more network access rights or restrictions of the at least one computing device on the protected network using at least one of the one or more access parameters and the at least one request parameter. That is, data processing system 110 can analyze information associated with the first node to determine the computing device is authorized or not authorized to perform the requested operation (e.g., access the DePin network). In some examples, determining network access rights or restrictions can include identifying at least one data structure of the protected network corresponding to the first node (e.g., a second node or a linked account or profile) and determining one or more attributes or parameters of the identified data structure that correspond with the output or update request. For example, in response to determining the first node corresponds with a device DID, data processing system 110 can retrieve device access parameters from the metadata object using the metadata reference and compare the retrieved attributes to the request parameters (e.g., to determine a match, to detect an anomaly or inconsistency, and so on).

In some examples, in response to determining the first node corresponds with a device DID, data processing system 110 can identify linked access parameters associated with the device by identifying a reference to a second DID (e.g., account DID) and accessing a corresponding metadata object of the second DID using the reference. For example, the request can correspond with a transaction operation, and the data processing system 110 can compare a request parameter (e.g., a transaction amount) against an access parameter or other attribute associated with the second node (e.g., an account spending limit) to verify the requesting device is permitted to initiate the transaction. In another example, data processing system 110 can verify the request parameters include a valid authentication credential (e.g., a passkey signature, a biometric approval, a cryptographic challenge response) based on a comparison with stored credentials and/or access conditions associated with the linked account or profile.

At block 455, the one or more processors can provide access. For example, block 455 can include providing or restricting, by the one or more processors, access of the at least one computing device to one or more functions or resources of the protected network based on the one or more network access rights or restrictions. That is, in response to determining network access rights satisfying one or more access parameters, the data processing system 110 can execute one or more operations to provide access to a requested function or resource (e.g., onboarding an employee device or customer device, processing a transaction, retrieving account data, granting access to an application or service). For example, providing access can include the data processing system 110 generating and/or provisioning access credentials (e.g., generating a session-based cryptographic key, issuing a signed API access token) based on the determined access rights and transmitting the generated credentials to the computing device associated with the first node. In some examples, restricting access can include the data processing system 110 prohibiting access to one or more network functions or resources (e.g., an exceeded transaction limit, an invalid authentication attempt, an unregistered device) by denying an access request, generating a security alert, and/or prompting additional verification steps (e.g., multi-factor authentication, account owner approval) based on identified network restrictions.

In some implementations, the method 400 can include storing, by the one or more processors, the first node in a graph storage, the graph storage including a plurality of secondary nodes linked with a plurality of primary nodes by a plurality of edges representing relationships between the plurality of secondary nodes and the plurality of primary nodes. For example, the graph storage can include a structured data model (e.g., a knowledge graph) that represents relationships between devices and users (e.g., customers or employees) in the protected network. That is, the graph storage can include a hierarchical mapping of decentralized identifiers assigned to computing devices and associated user accounts within an enterprise system. In some examples, a primary node can correspond with an account of a customer or employee, and secondary node can correspond to one or more devices associated with the customer or employee account. In some examples, the data processing system 110 can detect enrollment and/or addition of a user device and can provide one or more selectable options for a user to approve and/or decline establishment of a user-device relationship (e.g., by causing or preventing a device node from being added to the knowledge graph).

In some implementations, the method 400 can include linking, by the one or more processors, in the graph storage, the first node with a primary node of the plurality of primary nodes, the primary node corresponding with of a user of the at least one computing device, wherein the first node is one of the plurality of secondary nodes. In some examples, linking the first node with a primary node can provide and/or facilitate centralized access control and/or policy enforcement across multiple devices with access to a protected network. For example, a customer account (e.g., primary node) can be linked to multiple devices (e.g., secondary nodes) such as a customer smartphone, tablet, and laptop on the graph storage by edges connecting corresponding device and account nodes. For example, an employee account (e.g., primary node) can be linked to secondary nodes representing one or more multiple company-registered devices (e.g., in an employer-provisioned model) and/or personal devices (e.g., in a bring-your-own-device model). That is, linking can include the data processing system 110 creating or modifying an entry (e.g., edge) in the graph storage that connects the first node (device DID) to a primary node (account DID). For example, in response to registering a device, the data processing system 110 can update data associated with an account node by storing a reference to a corresponding device node in the graph storage.

In some implementations, accessing the graph storage and retrieving metadata of the primary node can include identifying, by the one or more processors, at least one edge of the plurality of edges linking the first node to the primary node, where the at least one edge represents a relationship between the first node and the primary node. For example, the data processing system 110 can query the graph storage to identify a connection between the first node (e.g., a device DID) and a primary node (e.g., an account DID) by locating a graph entry representing an edge linking the two nodes. In some examples, retrieving metadata of the primary node can include traversing and/or following the identified edge to resolve the primary node reference and accessing account-level attributes (e.g., user roles, access policies, authentication conditions) stored in association with the primary node. Additionally, the data processing system 110 can determine multiple edges linking the first node to multiple primary nodes (e.g., a shared device associated with multiple accounts) and retrieve metadata from one or more of the multiple primary nodes based on the request parameters.

In some implementations, accessing the graph storage and retrieving metadata of the primary node can include traversing, by the one or more processors, the graph storage by using the at least one edge to access the metadata of the primary node. For example, traversing the graph can include querying a structured dataset in which nodes represent computing devices, accounts, or access policies, and edges define relationships between the nodes. That is, the data processing system 110 can traverse the graph storage by identifying a direct or indirect connection between the first node (e.g., a device DID) and the primary node (e.g., an account DID), following a relationship encoded in an edge (e.g., "OWNED_BY," "GRANTED_ACCESS," "AUTHENTICATED_BY"). For example, the data processing system 110 can traverse the graph structure by iteratively resolving node relationships, identifying references to linked entities, and retrieving stored metadata based on a traversal path. In some examples, traversing the graph storage can include performing a depth-first or breadth-first search to determine hierarchical relationships by identifying multiple secondary nodes (e.g., devices) linked to a primary node (e.g., an enterprise account) and retrieving metadata defining access control rules for the identified devices.

In some implementations, accessing the graph storage and retrieving metadata of the primary node can include determining, by the one or more processors, based on the metadata of the primary node, at least one access parameter corresponding with the first node.

In some implementations, determining the one or more network access rights or restrictions can include identifying, by the one or more processors, at least one data structure of the protected network corresponding to the first node. For example, the data processing system 110 can identify a network-accessible data structure storing access control information (e.g., a metadata object associated with the primary node, a permissions registry, or a knowledge graph) associated with the device requesting network access. That is, the data processing system 110 can identify and/or otherwise determine a data structure including constraints or permissions applicable to one or more requested resources or functions and/or the first node (e.g., linked user accounts, organizational roles, group policies). In some implementations, determining the one or more network access rights or restrictions can include determining, by the one or more processors, at least one attribute or parameter of the at least one data structure corresponding to the output or update request. For example, the data processing system 110 can extract access parameters from a metadata object of the primary node (e.g., an account DID) or retrieve policy attributes defining access rules for the protected network (e.g., authentication policies, transaction limits, session constraints).

In some implementations, determining the one or more network access rights or restrictions can include comparing, by the one or more processors, the at least one attribute or parameter of the at least one data structure to the at least one request parameter. For example, the data processing system 110 can compare a request parameter (e.g., a requested access scope, a transaction amount, a geolocation) to a corresponding access parameter retrieved from the metadata object (e.g., a permission or activation status, an authorized region, an authentication factor, a transaction limit). For example, in response to identifying an association between the first node (e.g., a device DID) and the primary node (e.g., an account DID), the data processing system 110 can retrieve access parameters defining operational constraints, authentication rules, or resource access policies applicable to the first node. That is, determining the access parameters can include resolving access conditions stored in association with the primary node, which can define permitted operations, role-based access restrictions, or security requirements. In some examples, retrieving access parameters can include traversing a structured dataset (e.g., a knowledge graph) that encodes hierarchical relationships between nodes to resolve inherited permissions applicable to the first node. Alternatively, retrieving access parameters can include querying an access control registry or policy database storing conditions, constraints, or other parameters associated with various user profiles, accounts, and/or devices on the protected network.

In some implementations, determining the one or more network access rights or restrictions can include, in response to comparing the at least one attribute or parameter to the at least one request parameter, providing or restricting, by the one or more processors, the access of the at least one computing device to one or more functions or resources of the protected network. For example, in response to determining the request parameters satisfy the access conditions stored in the metadata object, the data processing system 110 can permit the requested operation (e.g., authorizing a device login, approving a financial transaction, granting API access). Alternatively, in response to detecting that the comparison identifies a restriction (e.g., a mismatched credential, an exceeded transaction limit, an unauthorized network request), the data processing system 110 can deny access, trigger an alert, or prompt additional authentication. In some examples, providing or restricting access can include determining an access outcome based on one or more rule sets, policy conditions, or predefined authorization criteria stored in association with the first node or a related entity (e.g., an associated account, an organizational role, or a linked access policy). That is, the data processing system 110 can determine to permit or deny the requested operation based on an evaluation of network access conditions applicable to a requesting device or user.

In some implementations, the method 400 can include generating, based on comparing the at least one attribute or parameter to the at least one data structure, at least one of a confirmation or status alert corresponding with the at least one computing device accessing the protected network. For example, the data processing system 110 can generate a confirmation message when the request parameters satisfy the access conditions to indicate successful authorization of the requested operation. Alternatively, in response to determining the comparison identifies a restriction or policy violation (e.g., an invalid credential, a request exceeding predefined limits, an unauthorized access attempt), the data processing system 110 can generate a status alert notifying the computing device and/or other systems (e.g., an administrative system) of the restriction. That is, the generated confirmation or status alert can provide real-time feedback on the outcome of the access request. In some implementations, the method 400 can include providing the at least one of the confirmation or status alert to a graphical user interface of the at least one computing device. For example, the data processing system 110 can transmit the generated confirmation or status alert to the computing device associated with the first node to cause a graphical user interface to display an approval notification, a security warning, or a verification prompt based on the generated confirmation or status alter. That is, the graphical user interface can present access control decisions in a structured format by displaying a confirmation, pop-up, and/or other graphical user interface elements and/or objects indicating an access control outcome (e.g., a successful log in, a failed log in, and so on).

In some implementations, the one or more access parameters of the metadata object can include at least one access context parameter including one or more conditions for permitting the at least one computing device to request access to the protected network. That is, the data processing system 110 can evaluate the access context parameter to determine a request from a user device satisfies predefined access conditions associated with a corresponding metadata object. In some implementations, the at least one access context parameter can include a geographic location of the at least one computing device. That is, the data processing system 110 can determine the geographic location of the computing device satisfying an authorized access region indicated by (e.g., stored in) the metadata object. For example, a request originating from a permitted geographic location (e.g., a designated office network, an authorized country) can be approved, whereas a request from an unauthorized region (e.g., a foreign IP address, an unrecognized network zone) can be restricted or flagged for additional verification.

In some implementations, the at least one access context parameter can include a temporal access interval corresponding with the network access request. That is, the data processing system 110 can determine that the request is submitted within or outside of an authorized time window defined by the metadata object. For example, a request received within a permitted temporal period or temporal access interval (e.g., standard business hours, an approved maintenance interval) can be processed, while a request outside of the temporal period or temporal access interval (e.g., an attempt to log in at an unauthorized interval) can be denied and/or subjected to additional authentication. In some implementations, the at least one access context parameter can include a compliance status indicating an association of the first node with a second node of the protected network, the second node corresponding with private data of the at least one computing device. For example, the data processing system 110 can determine the first node (e.g., a device DID) is recorded in the graph storage and linked to a second node (e.g., an account DID) by identifying a corresponding edge representing the association. That is, the compliance status can indicate that the first node is linked within the protected network to a second node corresponding with private data of the computing device. In some examples, private data can include any data of the protected network, such as private and/or access-controlled records, device attributes, account data, and/or enrollment data associated with the second node. For example, in response to determining the compliance status indicates that the first node is not linked to a second node, the data processing system 110 can restrict access, generate an alert, or initiate an update operation to establish an association between the first node and the second node (e.g., onboarding a device).

In some implementations, generating the at least one token can include verifying the network access request based on an authentication event using authentication data of the at least one computing device. For example, the data processing system 110 can verify the network access request by identifying and/or analyzing an authentication event (e.g., a passkey verification, a cryptographic challenge-response, a biometric scan) to confirm that the computing device is authorized to request access. That is, the authentication event can correspond with an operation confirming the identity and/or legitimacy of the at least one computing device. In some examples, verifying the network access request can include determining that authentication data (e.g., a passkey signature, an authentication token) corresponds with authentication conditions defined for the first node. For example, the data processing system 110 can verify that a passkey signature generated by the computing device corresponds with a public key associated with a primary node (e.g., an account DID). Responsive to determining the authentication event satisfying one or more access parameters (e.g., valid passkey authentication linked to the requesting user), the data processing system 110 can proceed to generate one or more tokens. In response to determining the authentication event fails (e.g., an unrecognized passkey, an expired authentication credential), the data processing system 110 can restrict token generation, prompt for additional verification (e.g., biometric confirmation, secondary authentication factor), and/or deny the request.

In some implementations, generating the at least one token can include generating a public-private key pair for the first node, the public-private key pair including a public key and a private key. For example, the data processing system 110 can generate the public-private key pair based on assigning a decentralized identifier (DID) to the first node, where the public key can be associated with a metadata object corresponding with the first node. That is, generating the key pair can establish cryptographic credentials for verifying operations associated with the first node, including access requests, update operations, or interactions with the control structure. In some examples, the data processing system 110 can generate the public-private key pair using one or more cryptographic techniques (e.g., elliptic curve digital signature algorithm (ECDSA), Rivest-Shamir-Adleman (RSA), or Edwards-curve Digital Signature Algorithm (EdDSA)). For example, the data processing system 110 can apply a key generation technique to derive a cryptographically linked public and private key pair, where the public key can be recorded in association with the first node, and the private key can be securely stored and/or provisioned for signing operations.

In some implementations, generating the at least one token can include generating a digital signature for the at least one token using the private key. For example, the data processing system 110 can apply a cryptographic signing operation to generate a digital signature using the private key corresponding with the first node. That is, the private key can be used to sign the token to establish authenticity and verify integrity of the metadata referenced by the token. For example, generating the digital signature can include computing a hash of the metadata reference or selected metadata attributes, signing the hash using the private key to generate a digital signature, and appending the resulting digital signature to the token. In some implementations, generating the at least one token can include recording the public key on the ledger. For example, the data processing system 110 can store the public key on a blockchain registry by generating and/or updating a ledger entry associated with the first node (e.g., a recorded token, metadata object, or DID document). In some implementations, the public key can be used to verify digital signatures generated when updating the metadata object. For example, when a request to modify the metadata object is received, the data processing system 110 can retrieve the public key from the ledger and verify that the request includes a valid digital signature generated using the private key. In response to the verification confirming that the request was signed using the corresponding private key, the data processing system 110 can authorize the update. In response to determining the digital signature does not match, the request can be rejected to prevent unauthorized modifications to the metadata object. Additionally, when a token referencing the metadata object is used in an access request, the data processing system 110 can retrieve the stored public key and verify that a digital signature generated for the token corresponds with an expected value.

In some implementations, verifying the network access can include identifying at least one authentication factor of the authentication data, the at least one authentication factor including at least one of a cryptographic key or identifier of the at least one computing device or biometric authentication data corresponding with a user of the at least one computing device. For example, the data processing system 110 can identify authentication data associated with the network access request including at least one authentication factor satisfying predefined access conditions. That is, the data processing system 110 can verify that the request includes an expected cryptographic key, a device identifier linked to an authorized computing device, or biometric authentication data associated with an enrolled user profile. In some examples, verifying the network access can include validating a passkey authentication event by confirming that a cryptographic signature generated by the computing device corresponds with a stored public key associated with an account DID. For example, the data processing system 110 can retrieve an authentication key linked to the computing device and validate that the passkey signature provided in the request was generated using the corresponding private key. In response to determining the authentication factor satisfies verification criteria (e.g., the passkey is linked to an authorized user, the cryptographic key matches an expected value, the biometric data corresponds with a stored user profile), the data processing system 110 can approve the network access request. In response to determining the authentication factor does not satisfy access conditions (e.g., an unrecognized cryptographic key, an incorrect biometric match, a revoked authentication credential), the data processing system 110 can deny access, prompt for additional verification (e.g., a secondary authentication factor), and/or generate an alert indicating a potential security event.

In some implementations, the method 400 can include receiving a revocation request including updated network access rights or restrictions of the at least one computing device. For example, the revocation request can indicate that the first node (e.g., a device DID) should be revoked due to device loss, decommissioning, or replacement. That is, the revocation request can include a command and/or indication that network access for the first node is to be terminated or reassigned to a new computing device. In some examples, the revocation request can correspond with generating a new device DID for a replacement computing device and maintaining an association with an existing account or user profile. In some examples, the revocation request can include updating an access parameter in the metadata object to replace an existing device identifier with a new identifier and preserving previously granted network permissions. Additionally, the revocation request can be associated with an event associated with a physical and/or digital resource such as credential expiration, device deactivation, or a change in compliance status within the protected network (e.g., a DePin network update). For example, the data processing system 110 can receive a revocation request indicating that the first node (e.g., a device DID) should be disassociated from a primary node (e.g., an account DID) due to a detected policy violation, a compromised credential, or an unauthorized modification attempt.

In some implementations, the method 400 can include updating at least one of the one or more access parameters of the metadata object to indicate a restricted network access status for the at least one computing device. For example, the data processing system 110 can modify an access parameter (e.g., an active status flag, a linked device reference) in the metadata object to revoke or suspend access for the first node. That is, updating the metadata object can including modifying stored parameters and/or metadata that define permissions and/or restrictions of the first node to perform network operations and/or access resources on the protected network. In some examples, updating the metadata object can include removing or invalidating a device identifier linked to the first node (e.g., removing an authorized device reference, replacing an old device identifier with a newly registered identifier) in response to a revocation condition (e.g., a lost or stolen device). In some implementations, updating the metadata object can include modifying cryptographic keys associated with the first node (e.g., revoking an existing authentication key and issuing a new key pair for a replacement device).

In some implementations, the method 400 can include updating, based on determining the revocation request satisfies a predefined revocation condition corresponding the updated network access rights or restrictions, the control structure of the first node to prevent the outputs or updates of the metadata object. For example, the data processing system 110 can determine that the revocation request meets predefined revocation conditions (e.g., verification of a cryptographic signature, confirmation from an authorized entity, detection of a security event such as a lost or compromised device). Upon verification, the data processing system 110 can update the control structure (e.g., a smart contract) to prevent execution of further operations related to the first node. That is, updating the control structure can include modifying an execution condition, state variable, or other parameter within the smart contract associated with the first node to block transactions that attempt to retrieve (e.g., use) or modify (e.g., update) the corresponding metadata object.

In some implementations, the at least one request parameter can correspond with one or more functions or resources of the protected network. That is, the request parameter can define an operation or service to be executed within the network and/or indicate a system, service, asset, or other data managed by the network. In some examples, a function of the protected network can include executing a network service, performing a system action, processing a request, or interacting with a control structure. For example, functions can include performing authentication (e.g., verifying a digital signature), enforcing access policies (e.g., analyzing role-based permissions), executing a transaction (e.g., transferring digital assets or updating a distributed ledger), retrieving secured data (e.g., querying metadata objects or encrypted records), or processing a system event (e.g., a device revocation). In some examples, a resource of the protected network can include any secured asset, computing component, or access-controlled data object managed within the protected network. For example, resources can include assets, account data, cryptographic keys, decentralized identifiers, access credentials, digital signatures, tokenized records, financial data, regulatory compliance records, and/or other stored data or records.

In some implementations, providing or restricting the access to the one or more functions or resources can include performing at least one network operation corresponding with the one or more functions or resource, wherein the at least one network operation includes at least one of (i) retrieving or updating data corresponding to the first node or (ii) transmitting a request to initiate a resource transfer over the protected network. That is, retrieving data can include querying an account balance, retrieving recent transaction history, accessing account authentication settings, and/or obtaining other information linked to a user account (e.g., employee account, customer account, financial account). For example, updating data can include updating device metadata (e.g., modifying a registered device identifier, updating cryptographic key pairs for authentication), changing a payment setting (e.g., modifying a payment method, adjusting resource transfer limits, updating recurring payment configurations), and/or modifying access parameters associated with a user account (e.g., updating an activate status or revocation state or reassigning device credentials). That is, a resource transfer can include performing a transaction (e.g., transferring funds between linked accounts, processing a payment request, or settling a transaction), updating digital assets (e.g., adjusting account balances), or authorizing access to a protected resource (e.g., provisioning a credential for a secure transaction).

In some implementations, providing or restricting the access to the one or more functions or resources can include applying, based on the metadata object, at least one condition restricting execution of the at least one network operation. That is, the data processing system 110 can apply a condition in the control structure to block, delay, or modify execution of a requested operation based on access parameters stored in the metadata object. For example, restricting execution can include the data processing system 110 modifying an execution condition in the control structure to enforce an access restriction. That is, in response to determining the metadata object includes a temporal access interval, the data processing system 110 can check the request timestamp against the stored interval before execution, and responsive to determining the request falls outside the allowed temporal window, the data processing system 110 can prevent execution by rejecting the request, returning an error response, or prompting for additional authorization. In another example, the metadata object can include an access condition requiring an association with an active account for protected network access, the data processing system 110 can traverse a graph storage to verify that the first node is linked to a primary node (e.g., a device is registered). In response to determining no valid association is found, the control structure can prevent execution by blocking transaction processing, restricting access to requested resources, and/or requiring account reauthorization.

In some implementations, the metadata includes at least one device attribute of the at least one computing device applied to the node model to generate the first node. For example, a device attribute can include hardware-based identifiers (e.g., a device serial number, a trusted platform module key, a secure enclave identifier), network-related parameters (e.g., an assigned IP address, a registered MAC address, an enrollment certificate), or cryptographic credentials (e.g., a public key, an authentication token). For example, applying a device attribute to the node model can include using the attribute as an input parameter in a deterministic function to generate a decentralized identifier (DID) for the device. That is, the data processing system 110 can process one or more device attributes (e.g., a hardware identifier, cryptographic key, or network parameter) through a hashing function or encoding mechanism to derive the first node corresponding with the computing device.

In some implementations, the external storage system includes a wallet system of a user of the at least one computing device. For example, the computing device can include a digital wallet storing one or more dNFTs with metadata encoding and/or storing one or more parameters, device attributes, or cryptographic credentials associated with the first node. In some implementations, the method 400 can include retrieving the metadata object from the wallet system in response to the output or update request using the metadata reference. That is, the data processing system 110 can retrieve the metadata object by resolving the metadata reference stored in the dNFT, identifying the corresponding metadata object, and extracting access parameters, device attributes, or cryptographic keys from the stored metadata. For example, retrieving the metadata object can include querying the wallet system for a dNFT associated with the first node, verifying the integrity of the dNFT using a cryptographic signature or hash value, and accessing the metadata stored within the token.

In some implementations, the method 400 can facilitate different networks (each corresponding to a different provider institution, platform, application, enterprise, etc.) establishing single verified identity for a user, device, and/or resource instrument to be shared across those networks. For example, the single verified identity can be identified using a decentralized identifier, which can be provided to different networks to identify the user. In some implementations, a provider institution has a provider institution Decentralized Identifier (DID), and users (e.g., customers) of the provider institution have respective user DIDs. A blockchain registry communicates with a universal resolver to resolve shared DIDs. The universal resolver can use a secure enclave environment for identity resolution. Personal Identity Information (PII) can be restricted from exposure to the universal resolver to provide trust. In some examples, the universal resolver can be provided as a service to provider institutions, platforms, applications, enterprises, and individual devices. The universal resolver can resolve metadata to create a single record for each user. In some arrangements, various different provider institutions, platforms, applications, enterprises, and individual devices can opt in and provide metadata to the resolver, which can resolve metadata from the different provider institutions, platforms, applications, enterprises, and individual devices.

Figure 5:
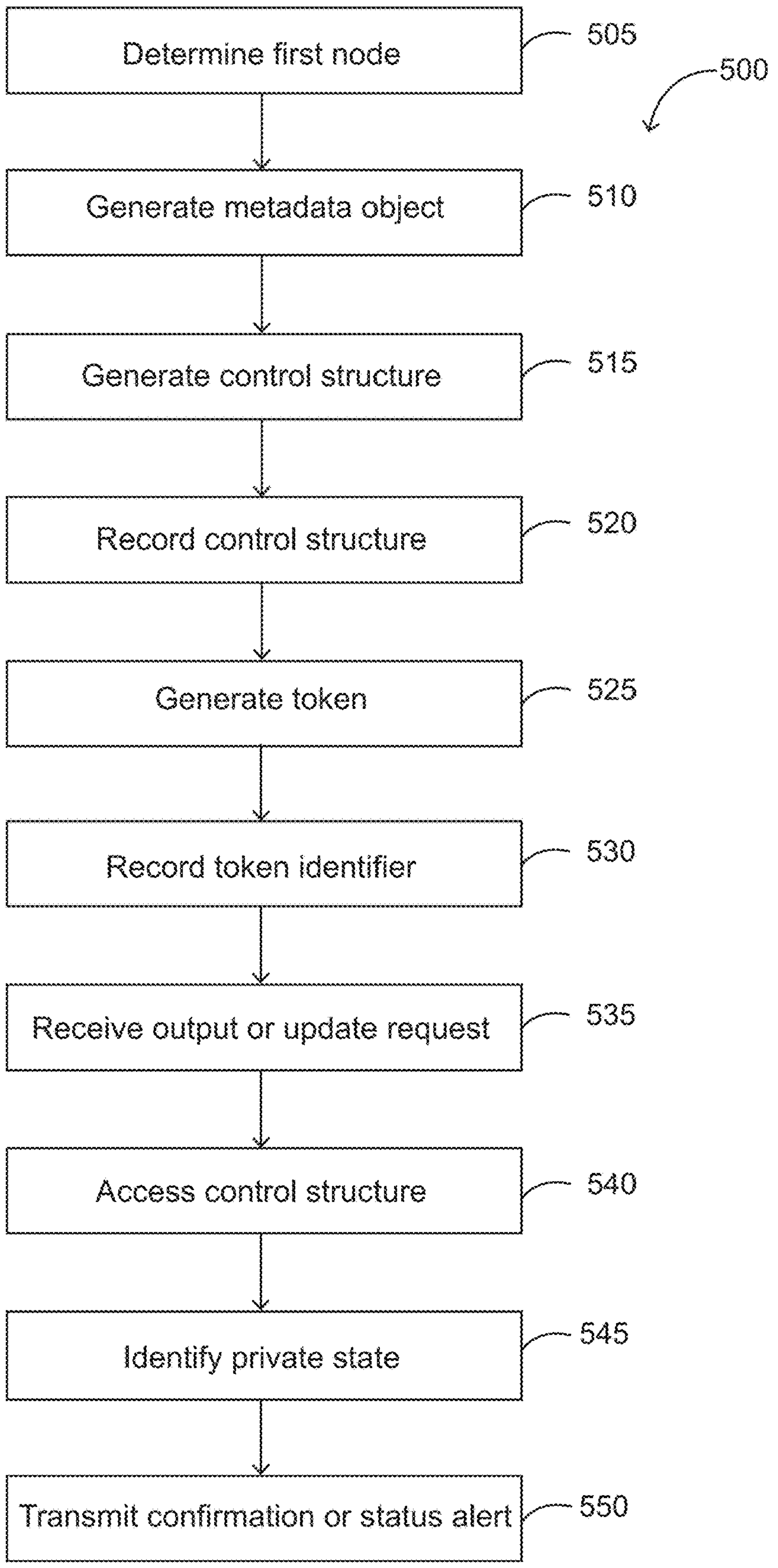
FIG. 5 depicts a flowchart diagram of an example method for node-based resource protection, according to some implementations.

Referring now to FIG. 5, a flowchart diagram of an example method 500 for node-based resource validation is shown, according to some implementations. At least one of the example systems of FIG. 1, FIG. 2, FIG. 3, and/or FIG. 6 can perform method 500 according to present implementations. In some implementations, additional, fewer, or different operations can be performed in method 500 depending on the implementation. In some implementations, some, or all operations of method 500 can be performed by one or more processors executing on one or more computing devices, systems, or servers. In various implementations, at least one operation can be re-ordered, added, removed, or repeated. Additionally, some or all of the operations performed by the blocks can be removed or added.

In broad overview of method 500, at block 505, one or more processors (e.g., data processing system 110) can determine a first node. At block 510, the one or more processors can generate a metadata object. At block 515, the one or more processors can generate a control structure. At block 520, can record the control structure. At block 525, the one or more processors can generate a token. At block 530, the one or more processors can record a token identifier. At block 535, the one or more processors can receive an output or update request. At block 540, the one or more processors can access a control structure. At block 545, the one or more processors can identify a private state. At block 550, the one or more processors can transmit a confirmation or status alert.

At block 505, one or more processors (e.g., data processing system 110) can determine and/or otherwise identify a first node. For example, block 505 can include determining, by one or more processors, a first node for an encoded object of a resource instrument based on metadata of the resource instrument. That is, determining the first node can include applying a node model to format a structured identifier (e.g., DID and/or any other identifier) corresponding with the resource instrument and/or encoded object. In some implementations, the resource instrument can include and/or correspond with a financial instrument (e.g., a payment card, check, virtual payment credential) issued by a financial entity and/or provider institution, the encoded object can include and/or correspond with a machine-readable code and/or representation of the resource instrument (e.g., a printed barcode or QR code, an NFC tag, an embedded chip) encoding data linked to the resource instrument, and the first node can be derived from metadata associated with the resource instrument and/or encoded object. For example, determining or identifying a first node can include the data processing system 110 receiving and/or collecting metadata including account identifiers, expiration data, instrument type, issuer parameters, and/or cryptographic attributes corresponding with the resource instrument. In some examples, determining the first node can include the data processing system 110 processing an issuance event for a newly created resource instrument, identifying metadata associated with the resource instrument, and/or generating a node identifier corresponding with the resource instrument using a deterministic function.

At block 510, the one or more processors can generate and/or otherwise identify a metadata object. For example, block 510 can include generating, by the one or more processors, a metadata object including the metadata, wherein the metadata object includes at least one resource lifecycle indicator corresponding with a private state of the resource instrument on a protected network. That is, the metadata object can store and/or encode attributes associated with the resource instrument, including operational parameters, usage conditions, and/or status indicators. For example, the metadata object can include lifecycle data (e.g., a resource lifecycle indicator) indicating a corresponding resource instrument is active, pending, expired, or revoked. In some examples, the metadata object can include usage conditions (e.g., number of uses, spending limits, or geographic restrictions) defining permitted and/or restricted uses of the resource instrument on the protected network. Additionally, the metadata object can reference authentication parameters, including cryptographic keys or issuer-provided validation criteria associated with the resource instrument and/or encoded object. In some implementations, generating the metadata object can include the data processing system 110 structuring and/or formatting metadata into a structured data object configured to facilitate verification processes, policy enforcement, or network-based validation of the resource instrument. In some implementations, block 510 can include identifying the metadata object. For example, the data processing system 110 can identify an existing metadata object associated with a node by querying a storage system or ledger and/or interfacing with a user wallet of a user device.

At block 515, the one or more processors can generate and/or otherwise use a control structure. For example, block 515 can include generating, by the one or more processors, a control structure including a link to the metadata object. In some examples, generating the control structure can include the data processing system 110 generating and/or updating a smart contract, rule set, or permission layer configured to execute and/or otherwise enforce rules and/or policies for resource validation, transaction authorization, and/or lifecycle updates. For example, the control structure can include instructions and/or parameters indicating conditions or restrictions for metadata object retrieval and/or updates. In some implementations, generating the control structure can include encoding references to the metadata object, such as a cryptographic hash or tokenized pointer, within a smart contract. In some implementations, block 520 can include using a control structure. For example, the data processing system 110 can identify and/or retrieve an existing smart contract associated with a metadata object by querying a blockchain registry and execute commands and/or instructions defined by the retrieved smart contract. At block 520, can record and/or otherwise store the control structure. For example, block 520 can include recording, by the one or more processors, on a ledger, the control structure. That is, recording the control structure can include the data processing system 110 committing and/or otherwise providing a representation of the control structure to a blockchain registry to facilitate various network operations using the metadata linked with the resource instrument/encoded object. For example, recording can include generating a ledger entry that stores a reference to the control structure, such as a transaction hash, smart contract address, and/or another cryptographic identifier.

At block 525, the one or more processors can generate and/or otherwise provide a token. For example, block 525 can include generating, by the one or more processors, using the control structure, at least one token including a token identifier and corresponding with the metadata object, the at least one token compatible with the control structure restricting outputs or updates of the metadata object. That is, generating the token can include the data processing system 110 creating a cryptographically verifiable object (e.g., a dNFT) that encodes permissions, usage constraints, and/or validation conditions for accessing or updating a corresponding metadata object. For example, the token identifier can be generated by applying a hash function, encoding scheme, or other cryptographic technique to encode references to the metadata object and control structure. In some examples, generating the token can include structuring token data to include a pointer to the metadata object linked to the resource instrument. At block 530, the one or more processors can record and/or otherwise store a token identifier. For example, block 530 can include recording, by the one or more processors, on the ledger and/or another data source, the token identifier. That is, recording the token identifier can include the data processing system 110 generating and/or storing a ledger entry with a reference that associates the token with the corresponding control structure and metadata object to facilitate subsequent network operations referencing the resource instrument and/or using the encoded object.

At block 535, the one or more processors can receive an output or update request. For example, block 535 can include receiving, by the one or more processors, from at least one scanning device or instrument system using the encoded object of the resource instrument, an update or output request including at least the first node. That is, receiving the output or update request can include the data processing system 110 processing a request transmitted by a scanning device or instrument system that interacts with the encoded object of the resource instrument. In some examples, the request can include data extracted from the encoded object, such as the first node identifier, a token reference, and/or transaction details related to a validation event or resource operation. For example, the scanning device can capture a machine-readable code (e.g., QR code, barcode) or interact with an embedded component (e.g., NFC chip, secure element) to extract and transmit the encoded data for processing. That is, receiving the output or update request can include the data processing system 110 identifying the first node in the request data and determining the request corresponds with an access verification, resource transfer, or metadata update operation.

At block 540, the one or more processors can access and/or otherwise identify a control structure. For example, block 540 can include accessing, by the one or more processors, by interfacing with the control structure on the ledger, the metadata object by retrieving a metadata reference corresponding with the at least one token from the control structure and using the metadata reference to obtain the metadata object from an external storage system. That is, accessing the control structure can include the data processing system 110 identifying a control structure entry on the ledger corresponding with the first node or token identifier. For example, the data processing system 110 can interface with the control structure to retrieve information and/or cause execution of stored execution logic, conditions, or policies defining access parameters and update restrictions for the metadata object. In some implementations, accessing the control structure can include the data processing system 110 resolving and/or otherwise using a stored reference (e.g., a transaction hash, contract address, or linked metadata pointer) to locate the metadata object within an external storage system (e.g., a user wallet or other data source).

At block 545, the one or more processors can identify and/or otherwise determine a private state. For example, block 545 can include identifying, by the one or more processors, the private state of the resource instrument on the protected network based on the at least one resource lifecycle indicator. That is, identifying the private state can include the data processing system 110 retrieving and extracting the resource lifecycle indicator from the metadata object to determine an operational status, usage restriction, and/or other attribute of the resource instrument on the protected network (e.g., type of instrument, an active or pending status, an expired or revoked state). For example, identifying the private state can include the data processing system 110 analyzing the resource lifecycle indicator to determine the resource instrument is used, unused, active, suspended, expired, and/or revoked. In some examples, identifying the private state can include determining the resource instrument has reached a predefined usage threshold, exceeded a transaction limit, or is flagged for renewal and/reauthorization. In some examples, the data processing system 110 can determine the resource instrument is linked to an active account, associated with a pending approval, and/or otherwise permitted to access networked resources and/or functions.

At block 550, the one or more processors can transmit and/or otherwise provide a confirmation or status alert. For example, block 550 can include transmitting, by the one or more processors, to the at least one scanning device or instrument system, at least one of a confirmation or a status alert including an indication of the private state. That is, transmitting the confirmation or status alert can include the data processing system 110 generating a response or notification based on the identified private state of the resource instrument and transmitting the response or notification to the scanning device or instrument system. For example, responsive to approving a resource transfer or verifying a requested transaction on the protected network, the data processing system 110 can provide a confirmation indicating that the resource instrument is valid and/or authorized for use. Alternatively, the private state can indicate the resource instrument is restricted, the data processing system 110 can generate a status alert indicating an error condition, usage restriction, and/or remediation step. For example, the resource lifecycle indicator can indicate the instrument is revoked or expired, the data processing system 110 can transmit a status alert preventing further operations and providing instructions for reauthorization, replacement, or renewal of the resource instrument and/or encoded object. In some examples, the data processing system 110 can transmit the confirmation or status alert for display on a user interface of the scanning device, trigger an automated action (e.g., decline a transaction, prompt for additional authentication), and/or notify a third-party system (e.g., issuer) based on the detected lifecycle status.

In some implementations, the resource instrument includes a restricted-usage instrument. That is, the resource instrument can include and/or refer to an object assigned and/or designated for a predefined number of uses, a limited transaction scope, or a validation event. For example, a restricted-usage instrument can include a one-time-use check, a rebate voucher, or a temporary access credential, which can be issued and/or encoded with constraints (e.g., conditions, restrictions, or limitations) preventing reuse or modification. In some examples, a restricted-usage instrument can include a financial instrument that is valid for one-time use or use within a predefined timeframe, geographic region, and/or authorized recipient category. Additionally, the data processing system 110 can determine the resource instrument is a restricted-usage instrument based on metadata stored in the metadata object (e.g., a resource type).

In some implementations, the method 500 can include generating, by the one or more processors, the encoded object including a code, wherein the code encodes data of the first node. That is, generating the encoded object can include the data processing system 110 creating a machine-readable representation of the first node to facilitate scanning, validation, and/or transaction processing. For example, the encoded object can include a barcode, QR code, or another optically scannable format representing a structured identifier corresponding with the resource instrument. In some implementations, generating the encoded object can include structuring metadata using an encoding scheme (e.g., Base64, alphanumeric compression, Reed-Solomon error correction). For example, generating a QR code can include embedding a structured payload including the first node identifier, a reference to the control structure, and/or cryptographic elements (e.g., a digital signature) into a digital and/or visual representation configured for scanning.

In some implementations, the method 500 can include printing, by the one or more processors, the code on the restricted-usage instrument. That is, printing the code can include the data processing system 110 applying the encoded object to the surface of the restricted-usage instrument using one or more printing techniques. For example, the data processing system 110 can use printing techniques including inkjet printing, thermal transfer printing, laser engraving, and/or digital printing to apply the encoded object onto various physical elements of restricted-usage instruments. For example, the data processing system 110 can apply or use techniques including inkjet or thermal transfer printing for paper-based instruments (e.g., printed checks, vouchers, or tickets) and/or laser etching for plastic or metal instruments (e.g., payment cards, access badges). In some implementations, the data processing system 110 can print the encoded object in accordance with a standardized format configured for a type of the resource element (e.g., by embedding a generated code within a designated area of the resource instrument). Additionally, printing the code can include the data processing system 110 integrating security features such as microprinting, watermarking, or tamper-resistant overlays to improve the security of the resource instrument and/or prevent unauthorized modifications to the encoded object.

In some implementations, the method 500 can include receiving, by the one or more processors, based on the at least one scanning device or instrument system scanning the code, the update or output request including the encoded data of the first node extracted from the code. hat is, receiving the update or output request can include the data processing system 110 processing data extracted from the encoded object based on scanning the restricted-usage instrument. For example, scanning a QR code on a check can extract structured data including the first node identifier, a reference to the control structure, an issuer identifier, a transaction amount, a date of issuance, and/or an authentication signature. That is, receiving the update or output request can include extracting transaction data from the encoded object and submitting a request for access to one or more networked functions and/or resources including a portion of the extracted transaction data. For example, the data processing system 110 can perform and/or execute a network operation to redeem the restricted usage-instrument (e.g., to cash or deposit the check by transferring funds from an account indicated by the resource instrument to a recipient account) in response to scanning the encoded object. In some implementations, the data processing system 110 can apply additional verification responsive to identifying the restricted-usage resource instrument being presented by a non-customer (e.g., a user not previously associated with a provider institution).

In some implementations, the method 500 can include, in response to transmitting the confirmation, updating, by the one or more processors, the at least one resource lifecycle indicator to indicate a utilization status corresponding with the restricted-usage instrument. That is, updating the resource lifecycle indicator can include the data processing system 110 modifying a field in the metadata object to reflect that the check has been cashed, deposited, or otherwise used. For example, in response to confirming a successful validation event, the data processing system 110 can update the metadata object to mark the restricted-usage resource instrument as used or "cashed" to prevent duplicate transactions or unauthorized reuse. That is, in response to a subsequent output and/or update request using the restricted-usage resource instrument, the data processing system 110 can identify the updated resource lifecycle indicator, determine the utilization status, and prevent further network operations (e.g., transactions) using the restricted-usage instrument.

In some implementations, the method 500 can include updating, by the one or more processors, an execution condition of the control structure for processing the update or output request on the protected network based on detecting the utilization status. That is, updating the execution condition can include the data processing system 110 modifying a parameter, flag, or rule in the control structure to prevent further execution of transactions corresponding with the restricted-usage instrument. For example, upon detecting that a check has been cashed, the data processing system 110 can update the corresponding smart contract to block future attempts to process transactions associated with the check by setting an execution restriction, disabling associated smart contract functions, and/or updating stored logic to trigger an error output (e.g., fraud alert) in response to identifying the utilization status. For example, the data processing system 110 can modify the control structure to reference the updated utilization status as a termination condition and cause the control structure to prevent execution of further transactions related to the restricted-usage instrument on the protected network.

In some implementations, the resource instrument includes a persistent-usage instrument. For example, a persistent-usage instrument can include any instrument and/or credential configured to facilitate multiple operations and/or long-term use on the protected network (e.g., a credit card, debit card, prepaid card, bank-issued authentication token, access badge, and so on). That is, a restricted-usage instrument can be designated for single- or limited-use interactions (e.g., checks, vouchers, tickets) and a persistent-usage instrument can remain valid across multiple interactions with the protected network. In some implementations, the encoded object includes an embedded component of the persistent-usage instrument. For example, the encoded object of the persistent-usage instrument can include an integrated circuit chip (e.g., EMV chip, secure element), a radio frequency identification (RFID) tag, a near-field communication (NFC) module, a magnetic stripe, or any other embedded data storage and/or transmission component included on a physical card (e.g., credit card). That is, the encoded object can store a structured representation of the first node and can be configured to provide the first node during an access request, payment authorization, and/or other network interaction using the persistent-usage instrument and/or embedded component.

In some implementations, the method 500 can include encoding, by the one or more processors, data of the first node for storage on the embedded component. That is, encoding the data can include the data processing system 110 formatting and/or writing the first node identifier and/or associated metadata onto the embedded component of the persistent-usage instrument. For example, encoding can include programming an integrated circuit chip (e.g., an EMV chip or secure element) with the first node and/or associated data including cryptographic keys, account identifiers, or other structured data used for resource validation. In some implementations, encoding can include the data processing system 110 generating and/or storing a digitally signed identifier or authentication key within an NFC module, RFID tag, or magnetic stripe of the resource instrument such that the resource instrument and/or embedded component can provide data corresponding with the first node responsive to interactions with the protected network.

In some implementations, the method 500 can include receiving, by the one or more processors, based on an interaction between the embedded component and the at least one scanning device or instrument system, the update or output request including the encoded data of the first node extracted from the embedded component. That is, receiving the update or output request can include the data processing system 110 identifying and/or processing a request triggered by a scanning device, payment terminal, access control system, and/or other instrument system interacting with the embedded component of the persistent-usage instrument. For example, receiving the output or update request can the data processing system 110 receiving encoded data captured and/or extracted from the encoded object using a card reader, an NFC-enabled device, or an RFID scanner. In some examples, the scanning or instrument system can decode the encoded data and transmit the decoded data to the data processing system 110. In some examples, the data processing system 110 can receive encoded data and decode the encoded data to identify and/or reconstruct the first node from the update or output request.

In some implementations, the method 500 can include identifying, by the one or more processors, the metadata object using the encoded data of the first node. That is, identifying the metadata object can include the data processing system 110 retrieving the first node identifier from the update or output request and resolving a corresponding metadata reference. For example, the data processing system 110 can query a ledger entry, secure database, or wallet system using the first node identifier to locate and retrieve the associated metadata object. In some implementations, identifying the metadata object can include determining a stored reference linked to the first node, such as a pointer in a smart contract or a hash of the metadata object recorded in an external storage system. For example, the data processing system 110 can access a control structure entry associated with the first node to retrieve permissions, usage constraints, and/or lifecycle indicators for the persistent-usage instrument.

In some implementations, the update or output request includes at least one request parameter corresponding with one or more functions or resources of the protected network. That is, the request parameter can include and/or otherwise indicate a requested operation or resource interaction associated with the persistent-usage instrument. For example, the request parameter can include a transaction type (e.g., authorization request, payment processing, balance inquiry), a requested function (e.g., retrieving linked account information, initiating a fund transfer, updating a stored credential), and/or an identified resource (e.g., assets in an account corresponding with the resource instrument, third-party asset information, and so on). In some implementations, the request parameter can include metadata such as a transaction amount, a merchant identifier, a network service or resource designation, contextual data, and/or security data (e.g., cryptographic signature, a session token). For example, the data processing system 110 can process a request parameter indicating a transaction authorization attempt using the persistent-usage instrument and including one or more of a transaction amount, a merchant identifier, a transaction type (e.g., in-person point-of-sale, e-commerce, contactless payment), and/or a geographic location.

In some implementations, the method 500 can include retrieving, by the one or more processors, the metadata object using encoded data of the first node extracted from the encoded object of the resource instrument. That is, retrieving the metadata object can include the data processing system 110 using the first node identifier extracted from the update or output request to locate and access a stored metadata object. For example, retrieving the metadata object can include querying a ledger entry, a wallet system, or an external storage system using a pointer, hash, or reference linked with the first node. In some implementations, retrieving the metadata object can include resolving an association between the first node and a corresponding metadata record within a structured data store (e.g., a relational database, a blockchain registry, or an off-chain storage provider). For example, the data processing system 110 can retrieve the metadata object to obtain stored attributes of the persistent-usage instrument, such as lifecycle indicators, permission settings, linked account references, and/or usage conditions.

In some implementations, the method 500 can include determining, by the one or more processors, one or more network access rights or restrictions of the resource instrument based on comparing data corresponding with the metadata object to the at least one request parameter. For example, a request parameter can include a transaction amount, and the data processing system 110 can compare the transaction amount to a spending limit associated with the resource instrument by accessing the metadata object and/or retrieving another metadata object of user account linked with the resource instrument to determine the transaction is permitted and/or restricted. In some examples, a request parameter can include a merchant identifier, and the data processing system 110 can compare the merchant identifier to an approved merchant list stored in association with the metadata object to determine the resource instrument is authorized for use with the identified merchant. Additionally, a request parameter can include a geographic location, and the data processing system 110 can compare the location to a permitted region associated with the metadata object to determine the transaction corresponds with a permitted area. In some implementations, determining access rights or restrictions can include comparing a request parameter including an expected status, usage restriction, and/or lifecycle state to corresponding metadata fields stored within the metadata object of the persistent-usage instrument to identify the instrument remains valid and/or is restricted for operations on the protected network.

In some implementations, the method 500 can include, in response to determining at least one network operation corresponding with the one or more functions or resources is permitted based on the one or more network access rights or restrictions, performing, by the one or more processors, the at least one network operation corresponding with the one or more functions or resources using the resource instrument. That is, performing the network operation can include the data processing system 110 executing a transaction, granting access to a protected resource, updating stored information, or facilitating another network-based interaction in accordance with the determined access rights and/or restrictions. For example, executing a transaction can include processing a payment authorization, transferring funds between accounts, and/or completing a purchase using the persistent-usage instrument. In some implementations, the at least one network operation is based on the at least one request parameter. For example, performing a network operations can include the data processing system 110 initiating and/or facilitating a third-party resource transfer between accounts identified by the request parameter. In some examples, the data processing system 110 can perform the network operation response to identifying compliance with one or more conditions and/or restrictions indicated by the request parameter (e.g., usage restrictions, instrument type, geolocation, and so on).

In some implementations, the external storage system includes a wallet system of a user device, and the resource instrument includes a digital instrument stored on a wallet system. That is, the digital instrument can include and/or otherwise refer to a software-based representation of a resource instrument (e.g., a virtual card) stored within a digital wallet application and configured for network-based transactions, authentication, and/or validation. For example, the digital instrument can include a tokenized payment credential or a virtual card, and the encoded object of the digital instrument can include a cryptographic identifier stored within a secure enclave of a user device executing the digital wallet application. In some implementations, the digital instrument can be linked to a metadata object, and the data processing system 110 can retrieve and process metadata from the metadata object in response to an access request, transaction request, or other network interaction using the digital instrument. For example, responsive to a resource transfer request initiated using the digital instrument, the data processing system 110 can retrieve the metadata object from the wallet system and validate the corresponding metadata (e.g., device registration data, or geographic restrictions) against one or more parameters associated with the request.

In some implementations, the method 500 can include accessing, by the one or more processors, by interfacing with the control structure on the ledger, the metadata object from the wallet system using encoded data of the first node.

That is, accessing the metadata object can include the data processing system 110 using encoded data of the first node to retrieve metadata associated with the digital instrument from the wallet system. For example, the data processing system 110 can interface with the control structure recorded on the ledger to identify a stored reference linking the first node to the metadata object. In some implementations, accessing the metadata object can include resolving a cryptographic hash, pointer, or transaction record stored within the control structure to locate the corresponding metadata entry within the external storage system. For example, upon receiving a transaction request, the data processing system 110 can retrieve the metadata object to determine transaction conditions, usage policies, or network restrictions associated with the digital instrument.

In some implementations, the method 500 can include identifying, by the one or more processors, based on the metadata object, at least one additional node linked with the first node on the protected network, the at least one additional node including additional metadata. That is, identifying at least one additional node can include the data processing system 110 determining the metadata object includes a reference to another decentralized identifier (DID) linked with the first node and identifying metadata (e.g., access parameters or authentication information) associated with the other DID. For example, the additional node can correspond with a primary node (e.g., account DID) and/or secondary node (e.g., device DID) associated with the resource instrument on the protected network. For example, identifying can include the data processing system 110 retrieving account information or attributes applicable to the first node (e.g., role-based permissions, transaction or spending limits, and/or security parameters) based on identifying an inheritance relationship (e.g., knowledge graph edge) between the first node and the additional node using a graph storage.

In some implementations, identifying the private state includes comparing at least one request parameter of the update or output request to at least one of the at least one resource lifecycle indicator or the additional metadata. That is, the data processing system 110 can determine the private state of the resource instrument by analyzing and/or comparing request parameters against metadata stored in the metadata object or inherited from an additional node linked with the first node. For example, the data processing system 110 can compare a transaction amount included in the request parameter to a spending limit and/or account balance indicated by the metadata object of the first node or by an account DID linked to the first node. For example, the data processing system 110 can compare a request parameter indicating a device identifier to an approved device list stored in the additional metadata of an account DID. In some examples, responsive to determining comparing the request parameter to the lifecycle indicator or additional metadata, the data processing system 110 can update the private state to indicate a permitted status (e.g., validation success) or a restricted status (e.g., authorization failure).

In some implementations, the at least one additional node corresponds with at least one of the user device or a user of the user device. That is, the additional node can include a DID representing an account of a user with the protected network (e.g., a financial account) and/or a device registered by the user on the protected network (e.g., an employee or customer device). For example, the additional node can correspond with an account DID or device DID including a metadata object with access parameters and/or other metadata applicable to the first node representing a resource instrument. For example, the metadata object of the first node can include a link or reference used by the data processing system 110 to retrieve the metadata object of the additional node, and the metadata object of the additional node can include a link or reference used by the data processing system 110 to retrieve the metadata object of the first node.

In some implementations, the method 500 can include associating, by the one or more processors, based on activation of the resource instrument, the first node with the at least one additional node by updating the metadata object to include a reference or identifier of the at least one additional node. That is, associating the first node with the additional node can include the data processing system 110 updating the metadata object of the first node to store a pointer, identifier, or link to the metadata object of the additional node in response to activation of the corresponding resource instrument. For example, activating the resource instrument can include the data processing system 110 detecting an initialization event, such as provisioning of an instrument (e.g., providing a digital instrument in a wallet system, a card issuance event, check printing) and/or receiving an activation request (e.g., first-time use, account linking, credential verification), and updating the metadata object to establish a persistent association with an account DID or device DID linked to the instrument. In some implementations, associating the first node with an additional node can include the data processing system 110 updating corresponding control structures to enforce access conditions based on shared attributes between the first node and additional node (e.g., restricting transactions to accounts or devices linked to the resource instrument by corresponding metadata).

In some implementations, the method 500 can include, in response to receiving the update or output request, retrieving, by the one or more processors, the additional metadata using the reference or identifier of the at least one additional node. That is, retrieving the additional metadata can include the data processing system 110 identifying a reference or identifier of the additional node in the metadata object of the first node and using the reference to locate a corresponding metadata object. In some examples, retrieving the additional metadata can include the data processing system 110 accessing a control structure to resolve a stored pointer, querying a wallet system to obtain linked account attributes, or retrieving a ledger entry to obtain access conditions associated with the additional node. For example, the data processing system 110 can retrieve metadata indicating role-based permissions, transaction limits, or device authentication requirements applicable to the first node based on access and/or interfacing with the metadata object corresponding with an account DID or device DID linked to the resource instrument.

In some implementations, determining the first node at block 505 can include determining, by the one or more processors, using a node function, at least one function-based data element corresponding with the first node by applying the metadata to a node model. In some implementations, determining the first node at block 505 can include generating, by the one or more processors, using the node model, the first node by formatting the at least one function-based data element with a namespace indicator corresponding to the node function. That is, determining the first node can include the data processing system 110 generating a decentralized identifier (DID) by processing metadata associated with the resource instrument using a deterministic function. For example, the data processing system 110 can generate a node (e.g., DID and/or any other identifier)

structured according to a standardized format including a method identifier, a namespace identifier, and a method-specific identifier. For example, a function-based data element can include a method identifier, which can indicate the DID method used for resolution and validation on the protected network (e.g., "did:ledger," "did:bank," "did:wallet"). For example, a function-based data element can include a method-specific identifier, which can include a value derived from metadata fields associated with the resource instrument using a hashing function (e.g., SHA-256) or encoding scheme (e.g., Base58). In some examples, the namespace indicator or namespace identifier can provide and/or indicate an organizational scope or domain, such as a type of user, system, or resource a DID corresponds to (e.g., an account, device, merchant, card). For example, the data processing system 110 can generate a DID such as "did:bank:card:xyz123," in which the element "did" indicates a type of the identifier, "bank" indicates the issuing network or method identifier (e.g., function-based data element), "card" categorizes the resource as a payment instrument (e.g., namespace indicator), and "xyz123" represents a derived method-specific identifier (e.g., another function-based data element). That is, formatting can include the data processing system 110 organized and/or structured the namespace indicator and at least one function-based data element according to a predefined schema used for decentralized identifiers (e.g., W3C standards).

In some implementations, formatting can include the data processing system 110 constructing and/or structuring the node to facilitate resolution, retrieval, and/or validation processes on the protected network and/or other networks by internal and/or external users using internal and/or external systems. For example, internal and/or external users and/or systems can use the method identifier to determine a mechanism for resolving the node on the protected network (e.g., DePin network) and can apply various resolution protocols, cryptographic verification processes, and/or lookup operations to retrieve node-related metadata based on the method identifier. For example, internal and/or external users and/or systems can use the namespace indicator to categorize and/or determine a classification for the first node (e.g., identifying a node as corresponding with a user, device, or resource type). For example, internal and/or external users and/or systems can use the method-specific identifier to locate a corresponding metadata object by applying a resolution protocol associated with the method identifier to the generated method-specific identifier. That is, the method identifier can indicate a resolution protocol defining a manner in which the method-specific identifier is processed to retrieve metadata (e.g., whether the method-specific identifier is to be hashed, indexed, or decrypted), and the method-specific identifier can store encoded data that, when processed using the resolution protocol, can be transformed back into a reference, pointer, or key used to retrieve metadata. For example, resolving a method-specific identifier can include decoding an embedded resource reference (e.g., a device or account ID) using a predefined encoding scheme (e.g., Base58 decoding for compatibility with ledger storage) identified by the DID structure (e.g., using the method identifier).

In some implementations, the private state corresponds with at least one of an operational status, a utilization status, or a revoked status of the resource instrument. That is, the private state can indicate the resource instrument is active, in use, expired, or otherwise restricted within the protected network. For example, an operational status can indicate that the resource instrument is valid and available for transactions, access requests, or other network operations. For example, the utilization status can indicate that the resource instrument has reached a defined usage threshold, such as a check being cashed, a single-use credential being redeemed, or a persistent-usage instrument reaching a spending or access limit. For example, the revoked status can indicate that the resource instrument has been deactivated, suspended, or otherwise restricted from further use. In some implementations, determining the private state can include the data processing system 110 retrieving a resource lifecycle indicator and/or additional metadata associated with an account DID or device DID linked to the first node to determine a corresponding status of the resource instrument.

In some implementations, the confirmation includes a verification of one or more network operations of the protected network using the resource instrument based on detecting the operational status. That is, the data processing system 110 can generate a confirmation response based on identifying that the resource instrument is valid for one or more requested network operations. For example, in response to determining the private state indicates an activated operational status, the data processing system 110 can process a transaction request, grant access to a protected resource, and/or authorize an account-related operation. In some implementations, generating the confirmation can include the data processing system 110 retrieving metadata corresponding with the first node to validate and/or verify attributes such as spending limits, authentication data, or role-based permissions. In some examples, the data processing system 110 can transmit the confirmation to a user device (e.g., graphical user interface) or another internal and/or external system (e.g., a merchant system, a provider system, and so on).

In some implementations, the status alert is generated based on detecting the private state corresponding with the utilization status or the revoked status. That is, the data processing system 110 can generate a status alert in response to detecting the resource instrument is invalid for one or more requested network operations. For example, the utilization status can indicate that the resource instrument has been fully redeemed (e.g., a check has been cashed, a one-time credential has been used), and the data processing system 110 can generate an alert indicating that further transactions associated with the resource instrument are not permitted. For example, in response to determining and/or identifying the revoked status indicating that the resource instrument has been suspended or deactivated (e.g., based on to security parameters or expiration), the data processing system 110 can generate a status alert indicating that current or future uses of the resource instrument are invalid and/or fraudulent (e.g., a fraud or anomaly notification). In some implementations, generating the status alert can include the data processing system 110 transmitting an alert message to the requesting system and/or updating a control structure to restrict further processing attempts using the resource instrument.

Referring now to FIG. 6, a depiction of a computer system 600 is shown. The computer system 600 that can be used, for example, to implement the example system 100 of FIG. 1, the data processing system 110, and/or various other example systems described in the present disclosure. The computing system 600 includes a bus 605 or other communication component for communicating information and a processor 610 coupled to the bus 605 for processing information. The computing system 600 also includes main memory 615, such as a random-access memory (RAM) or other dynamic storage device, coupled to the bus 605 for storing information, and/or instructions to be executed by the processor 610. Main memory 615 can also be used for storing position information, temporary variables, and/or other intermediate information during execution of instructions by the processor 610. The computing system 600 can further include a read only memory (ROM) 620 or other static storage device coupled to the bus 605 for storing static information and instructions for the processor 610. A storage device 625, such as a solid-state device, magnetic disk or optical disk, is coupled to the bus 605 for persistently storing information and instructions.

The computing system 600 can be coupled via the bus 605 to a display 635, such as a liquid crystal display, and/or active matrix display, for displaying information to a user. An input device 630, such as a keyboard including alphanumeric and other keys, can be coupled to the bus 605 for communicating information, and/or command selections to the processor 610. In another implementation, the input device 630 has a touch screen display 635. The input device 630 can include any type of biometric sensor, a cursor control, such as a mouse, a trackball, and/or cursor direction keys, for communicating direction information and command selections to the processor 610 and for controlling cursor movement on the display 635.

In some implementations, the computing system 600 can include a communications adapter 640, such as a networking adapter. Communications adapter 640 can be coupled to bus 605 and can be configured to provide communications with a computing or communications network 130 and/or other computing systems. In various illustrative implementations, any type of networking configuration can be achieved using communications adapter 640, such as wired (e.g., via Ethernet), wireless (e.g., via Wi-Fi, Bluetooth), satellite (e.g., via GPS) pre-configured, ad-hoc, LAN, WAN.

According to various implementations, the processes that effectuate illustrative implementations that are described herein can be achieved by the computing system 600 in response to the processor 610 executing an arrangement of instructions contained in main memory 615. Such instructions can be read into main memory 615 from another non-transitory computer-readable medium (CRM), such as the storage device 625. Execution of the arrangement of instructions contained in main memory 615 causes the computing system 600 to perform the illustrative processes described herein. One or more processors in a multi-processing arrangement can also be employed to execute the instructions contained in main memory 615. In alternative implementations, hard-wired circuitry can be used in place of or in combination with software instructions to implement illustrative implementations. Thus, implementations are not limited to any specific combination of hardware circuitry and software.

That is, although an example processing system has been described in FIG. 6, implementations of the subject matter and the functional operations described in this specification can be carried out using other types of digital electronic circuitry, and/or in computer software (e.g., application, blockchain, distributed ledger technology) embodied on a tangible medium, firmware, and/or hardware, including the structures disclosed in this specification and their structural equivalents, and/or in combinations of one or more of them. implementations of the subject matter described in this specification can be implemented as one or more computer programs, e.g., one or more subsystems of computer program instructions, encoded on one or more computer storage medium for execution by, and/or to control the operation of, data processing apparatus. Alternatively, and/or in addition, the program instructions can be encoded on an artificially generated propagated signal, e.g., a machine generated electrical, optical, and/or electromagnetic signal, that is generated to encode information for transmission to suitable receiver apparatus for execution by a data processing apparatus. A computer storage medium can be, and/or be included in, a computer-readable storage device, a computer-readable storage substrate, a random or serial access memory array or device, and/or a combination of one or more of them. Moreover, while a computer storage medium is not a propagated signal, a computer storage medium can be a source or destination of computer program instructions encoded in an artificially generated propagated signal. The computer storage medium can also be, and/or be included in, one or more separate components or media (e.g., multiple CDs, disks, and/or other storage devices). Accordingly, the computer storage medium is both tangible and non-transitory.

Although shown in the implementations of FIG. 6 as singular, stand-alone devices, one of ordinary skill in the art will appreciate that, in some implementations, the computing system 600 can include virtualized systems and/or system resources. For example, in some implementations, the computing system 600 can be a virtual switch, virtual router, virtual host, virtual server. In various implementations, computing system 600 can share physical storage, hardware, and/or other resources with other virtual machines. In some implementations, virtual resources of the network can include cloud computing resources such that a virtual resource can rely on distributed processing across more than one physical processor, distributed memory, and so on.

While this specification contains many specific implementation details and/or arrangement details, these should not be construed as limitations on the scope of any disclosure or of what can be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features can be described above as acting in certain combinations and even initially claimed as such, one or more features from a claimed combination can in some cases be excised from the combination, and/or the claimed combination can be directed to a subcombination or variation of a subcombination.

Additionally, features described with respect to particular headings can be utilized with respect to and/or in combination with illustrative implementation described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, and/or that all illustrated operations be performed, to achieve desirable results. In some cases, the actions recited in the claims can be performed in a different order and still achieve desirable results. In addition, the processes depicted in the accompanying figures do not necessarily require the particular order shown, and/or sequential order, to achieve desirable results.

In certain circumstances, multitasking and parallel processing can be advantageous. Moreover, the separation of various system components in the implementations and/or arrangements described above should not be understood as requiring such separation in all implementations and/or arrangements, and/or it should be understood that the described program components and systems can generally be integrated together in a single software product or packaged into multiple software products.

Having now described some illustrative implementations, implementations, illustrative arrangements, and/or arrangements it is apparent that the foregoing is illustrative and not limiting, having been presented by way of example. In particular, although many of the examples presented herein involve specific combinations of method acts or system elements, those acts, and/or those elements can be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and/or additional items, as well as alternate implementations and/or arrangements consisting of the items listed thereafter exclusively. In one arrangement, the systems and methods described herein consist of one, at least one (e.g., each) combination of more than one, and/or all of the described elements, acts, and/or components.

Any references to implementations, arrangements, and/or elements or acts of the systems and methods herein referred to in the singular can also embrace implementations and/or arrangements including a plurality of these elements, and/or any references in plural to any implementation, arrangement, and/or element or act herein can also embrace implementations and/or arrangements including only a single element. References in the singular or plural form are not intended to limit the presently disclosed systems or methods, their components, acts, and/or elements to single or plural configurations. References to any act or element being based on any information, act or element can include implementations and/or arrangements where the act or element is based at least in part on any information, act, and/or element.

Any implementation disclosed herein can be combined with any other implementation, and/or references to "an implementation," "some implementations," "an alternate implementation," "various implementation," "one implementation" and so on are not necessarily mutually exclusive and are intended to indicate that a particular feature, structure, and/or characteristic described in connection with the implementation can be included in at least one implementation. Such terms as used herein are not necessarily all referring to the same implementation. Any implementation can be combined with any other implementation, inclusively or exclusively, in any manner consistent with the aspects and implementations disclosed herein.

Any arrangement disclosed herein can be combined with any other arrangement, and/or references to "an arrangement," "some arrangements," "an alternate arrangement," "various arrangements," "one arrangement" and so on are not necessarily mutually exclusive and are intended to indicate that a particular feature, structure, and/or characteristic described in connection with the arrangement can be included in at least one arrangement. Such terms as used herein are not necessarily all referring to the same arrangement. Any arrangement can be combined with any other arrangement, inclusively or exclusively, in any manner consistent with the aspects and arrangements disclosed herein.

References to "or" can be construed as inclusive so that any terms described using "or" can indicate any of a single, more than one, and/or all of the described terms.

Where technical features in the drawings, detailed description or any claim are followed by reference signs, the reference signs have been included for the sole purpose of increasing the intelligibility of the drawings, detailed description, and/or claims. Accordingly, neither the reference signs nor their absence have any limiting effect on the scope of any claim elements.

The systems and methods described herein can be embodied in other specific forms without departing from the characteristics thereof. The foregoing implementations and/or arrangements are illustrative rather than limiting of the described systems and methods. Scope of the systems and methods described herein is thus indicated by the appended claims, rather than the foregoing description, and/or changes that come within the meaning and range of equivalency of the claims are embraced therein.

It should be understood that no claim element herein is to be construed under the provisions of 35 U.S.C. § 112(f) unless the element is expressly recited using the phrase "means for."

It should be understood that the phrase "in response to" or "responsive to," as used herein, can include various causal and contextual relationships between an initiating event, action, and/or condition and a subsequent action or operation. That is, the phrases "in response to" or "responsive to" can include actions or operations performed directly as a result of the initiating event/action or condition, indirectly in relation to the initiating event/action or condition, based on data or parameters derived from or otherwise related to the initiating event/action or condition, and/or as a portion of a sequence or process of which the initiating event serves as one of multiple inputs, factors, and/or considerations causing the subsequent action or operation.

As used herein, the term "circuit" can include hardware structured to execute the functions described herein. In some implementations, at least one (e.g., each) respective "circuit" can include machine-readable media for configuring the hardware to execute the functions described herein. The circuit can be embodied as one or more circuitry components including, but not limited to, processing circuitry, network interfaces, peripheral devices, input devices, output devices, sensors. In some implementations, a circuit can take the form of one or more analog circuits, electronic circuits (e.g., integrated circuits (IC), discrete circuits, system on a chip (SOC) circuits), telecommunication circuits, hybrid circuits, and/or any other type of "circuit." In this regard, the "circuit" can include any type of component for accomplishing or facilitating achievement of the operations described herein. For example, a circuit as described herein can include one or more transistors, logic gates (e.g., NAND, AND, NOR, OR, XOR, NOT, XNOR), resistors, multiplexers, registers, capacitors, inductors, diodes, wiring.

The "circuit" can also include one or more processors communicatively coupled to one or more memory or memory devices. In this regard, the one or more processors can execute instructions stored in the memory or can execute instructions otherwise accessible to the one or more processors. In some implementations, the one or more processors can be embodied in various ways. The one or more processors can be constructed in a manner sufficient to perform at least the operations described herein. In some implementations, the one or more processors can be shared by multiple circuits (e.g., circuit A and circuit B can comprise or otherwise share the same processor which, in some example implementations, can execute instructions stored, and/or otherwise accessed, via different areas of memory). Alternatively, and/or additionally, the one or more processors can be structured to perform or otherwise execute certain operations independent of one or more co-processors. In other example implementations, two or more processors can be coupled via a bus to facilitate independent, parallel, pipelined, and/or multi-threaded instruction execution. At least one (e.g., each) processor can be implemented as one or more general-purpose processors, application specific integrated circuits (ASICs), field programmable gate arrays (FPGAs), digital signal processors (DSPs), and/or other suitable electronic data processing components structured to execute instructions provided by memory. The one or more processors can take the form of a single core processor, multi-core processor (e.g., a dual core processor, triple core processor, quad core processor), microprocessor. In some implementations, the one or more processors can be external to the apparatus, for example the one or more processors can be a remote processor (e.g., a cloud based processor). Alternatively, and/or additionally, the one or more processors can be internal and/or local to the apparatus. In this regard, a given circuit or components thereof can be disposed locally (e.g., as part of a local server, a local computing system) or remotely (e.g., as part of a remote server such as a cloud based server). To that end, a "circuit" as described herein can include components that are distributed across one or more locations.

An exemplary system for implementing the overall system or portions of the implementations can include a general purpose computing devices in the form of computers, including a processing unit, a system memory, and/or a system bus that couples various system components including the system memory to the processing unit. At least one (e.g., each) memory device can include non-transient volatile storage media, non-volatile storage media, non-transitory storage media (e.g., one or more volatile and/or non-volatile memories), and so on. In some implementations, the non-volatile media can take the form of ROM, flash memory (e.g., flash memory such as NAND, 3D NAND, NOR, 3D NOR), EEPROM, MRAM, magnetic storage, hard discs, optical discs, and so on. In other implementations, the volatile storage media can take the form of RAM, TRAM, ZRAM, and so on. Combinations of the above are also included within the scope of machine-readable media. In this regard, machine-executable instructions include, for example, instructions and data which cause a general purpose computer, special purpose computer, and/or special purpose processing machines to perform a certain function or group of functions. At least one (e.g., each) respective memory device can be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, can include any type of input device including, but not limited to, a keyboard, a keypad, a mouse, joystick or other input devices performing a similar function. Comparatively, the term "output device," as described herein, can include any type of output device including, but not limited to, a computer monitor, printer, facsimile machine, and/or other output devices performing a similar function.

It should be noted that although the diagrams herein can show a specific order and composition of method steps, it is understood that the order of these steps can differ from what is depicted. For example, two or more steps can be performed concurrently or with partial concurrence. Also, some method steps that are performed as discrete steps can be combined, steps being performed as a combined step can be separated into discrete steps, the sequence of certain processes can be reversed or otherwise varied, and/or the nature or number of discrete processes can be altered or varied. The order or sequence of any element or apparatus can be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure can be accomplished with standard programming techniques with rule-based logic and other logic to accomplish the various database searching steps, correlation steps, comparison steps and decision steps.

What is claimed is:

1. A system, comprising:

a data processing system comprising memory and one or more processors configured to:

receive, from at least one computing device, a network access request comprising metadata corresponding with the at least one computing device, the network access request corresponding with accessing a protected network using the at least one computing device;

apply the metadata to a node model to cause the node model to generate a first node;

generate a metadata object comprising the metadata, wherein the metadata object comprises one or more access parameters;

generate a control structure comprising a link to the metadata object;

record, on a ledger, the control structure;

generate, using the control structure, at least one token comprising a token identifier and corresponding with the metadata object, the at least one token compatible with the control structure restricting outputs or updates of the metadata object;

record, on the ledger, the token identifier;

receive, from the at least one computing device, an output or update request comprising the first node and at least one request parameter;

access, by interfacing with the control structure on the ledger, the metadata object by retrieving a metadata reference corresponding with the at least one token from the control structure and using the metadata reference to obtain the metadata object from an external storage system;

determine one or more network access rights or restrictions of the at least one computing device on the protected network using at least one of the one or more access parameters and the at least one request parameter; and provide or restrict access of the at least one computing device to one or more functions or resources of the protected network based on the one or more network access rights or restrictions.

2. The system of claim 1, the one or more processors configured to:

store the first node in a graph storage, the graph storage comprising a plurality of secondary nodes linked with a plurality of primary nodes by a plurality of edges representing relationships between the plurality of secondary nodes and the plurality of primary nodes; and link, in the graph storage, the first node with a primary node of the plurality of primary nodes, the primary node corresponding with of a user of the at least one computing device, wherein the first node is one of the plurality of secondary nodes;

wherein determining the one or more network access rights or restrictions comprises accessing the graph storage and retrieving metadata of the primary node.

3. The system of claim 2, wherein accessing the graph storage and retrieving metadata of the primary node comprises:

identifying at least one edge of the plurality of edges linking the first node to the primary node, the at least one edge representing a relationship between the first node and the primary node;

traversing the graph storage by using the at least one edge to access the metadata of the primary node; and determining, based on the metadata of the primary node, at least one access parameter corresponding with the first node.

4. The system of claim 1, wherein determining the one or more network access rights or restrictions comprises:

identifying at least one data structure of the protected network corresponding to the first node;

determining at least one attribute or parameter of the at least one data structure corresponding to the output or update request;

comparing the at least one attribute or parameter of the at least one data structure to the at least one request parameter; and in response to comparing the at least one attribute or parameter to the at least one request parameter, providing or restricting the access of the at least one computing device to one or more functions or resources of the protected network.

5. The system of claim 4, the one or more processors configured to:

generate, based on comparing the at least one attribute or parameter to the at least one data structure, at least one of a confirmation or status alert corresponding with the at least one computing device accessing the protected network; and provide the at least one of the confirmation or status alert to a graphical user interface of the at least one computing device.

6. The system of claim 1, the one or more access parameters of the metadata object comprise at least one access context parameter comprising one or more conditions for permitting the at least one computing device to request access to the protected network, the at least one access context parameter comprising at least one of:

a geographic location of the at least one computing device;

a temporal access interval corresponding with the network access request; or a compliance status indicating an association of the first node with a second node of the protected network, the second node corresponding with a private data of the at least one computing device.

7. The system of claim 1, wherein generating the at least one token comprises:

verifying the network access request based on an authentication event using authentication data of the at least one computing device;

generating a public-private key pair for the first node, the public-private key pair comprising a public key and a private key;

generating a digital signature for the at least one token using the private key; and recording the public key on the ledger.

8. The system of claim 7, wherein verifying the network access request comprises:

identifying at least one authentication factor of the authentication data, the at least one authentication factor comprising at least one of a cryptographic key or identifier of the at least one computing device or biometric authentication data corresponding with a user of the at least one computing device.

9. The system of claim 1, the one or more processors configured to:

receive a revocation request comprising updated network access rights or restrictions of the at least one computing device;

update at least one of the one or more access parameters of the metadata object to indicate a restricted network access status for the at least one computing device; and update, based on determining the revocation request satisfies a predefined revocation condition corresponding the updated network access rights or restrictions, the control structure of the first node to prevent the outputs or updates of the metadata object.

10. The system of claim 1, wherein the at least one request parameter corresponding with one or more functions or resources of the protected network, and wherein providing or restricting the access to the one or more functions or resources comprises:

performing at least one network operation corresponding with the one or more functions or resource, wherein the at least one network operation comprises at least one of (i) retrieving or updating data corresponding to the first node or (ii) transmitting a request to initiate a resource transfer over the protected network; or applying, based on the metadata object, at least one condition restricting execution of the at least one network operation.

11. The system of claim 1, wherein the metadata comprises at least one device attribute of the at least one computing device applied to the node model to generate the first node, wherein the external storage system comprises a wallet system of a user of the at least one computing device, and the one or more processors to:

retrieve the metadata object from the wallet system in response to the output or update request using the metadata reference.

12. A method, comprising:

receiving, by one or more processors, from at least one computing device, a network access request comprising metadata corresponding with the at least one computing device, the network access request corresponding with accessing a protected network using the at least one computing device;

applying, by the one or more processors, the metadata to a node model to cause the node model to generate a first node;

generating, by the one or more processors, a metadata object comprising the metadata, wherein the metadata object comprises one or more access parameters;

generating, by the one or more processors, a control structure comprising a link to the metadata object;

recording, by the one or more processors, on a ledger, the control structure;

generating, by the one or more processors, using the control structure, at least one token comprising a token identifier and corresponding with the metadata object, the at least one token compatible with the control structure restricting outputs or updates of the metadata object;

recording, by the one or more processors, on the ledger, the token identifier;

receiving, by the one or more processors, from the at least one computing device, an output or update request comprising the first node and at least one request parameter;

accessing, by the one or more processors, by interfacing with the control structure on the ledger, the metadata object by retrieving a metadata reference corresponding with the at least one token from the control structure and using the metadata reference to obtain the metadata object from an external storage system;

determining, by the one or more processors, one or more network access rights or restrictions of the at least one computing device on the protected network using at least one of the one or more access parameters and the at least one request parameter; and providing or restricting, by the one or more processors, access of the at least one computing device to one or more functions or resources of the protected network based on the one or more network access rights or restrictions.

13. The method of claim 12, further comprising:

storing, by the one or more processors, the first node in a graph storage, the graph storage comprising a plurality of secondary nodes linked with a plurality of primary nodes by a plurality of edges representing relationships between the plurality of secondary nodes and the plurality of primary nodes; and linking, by the one or more processors, in the graph storage, the first node with a primary node of the plurality of primary nodes, the primary node corresponding with of a user of the at least one computing device, wherein the first node is one of the plurality of secondary nodes;

wherein determining the one or more network access rights or restrictions comprises accessing the graph storage and retrieving metadata of the primary node.

14. The method of claim 13, wherein accessing the graph storage and retrieving metadata of the primary node comprises:

identifying, by the one or more processors, at least one edge of the plurality of edges linking the first node to the primary node, the at least one edge representing a relationship between the first node and the primary node;

traversing, by the one or more processors, the graph storage by using the at least one edge to access the metadata of the primary node; and determining, by the one or more processors, based on the metadata of the primary node, at least one access parameter corresponding with the first node.

15. The method of claim 12, wherein determining the one or more network access rights or restrictions comprises:

identifying, by the one or more processors, at least one data structure of the protected network corresponding to the first node;

determining, by the one or more processors, at least one attribute or parameter of the at least one data structure corresponding to the output or update request;

comparing, by the one or more processors, the at least one attribute or parameter of the at least one data structure to the at least one request parameter; and in response to comparing the at least one attribute or parameter to the at least one request parameter, providing or restricting, by the one or more processors, the access of the at least one computing device to one or more functions or resources of the protected network.

16. The method of claim 15, further comprising:

generating, by the one or more processors, based on comparing the at least one attribute or parameter to the at least one data structure, at least one of a confirmation or status alert corresponding with the at least one computing device accessing the protected network; and providing, by the one or more processors, the at least one of the confirmation or status alert to a graphical user interface of the at least one computing device.

17. The method of claim 12, the one or more access parameters of the metadata object comprise at least one access context parameter comprising one or more conditions for permitting the at least one computing device to request access to the protected network, the at least one access context parameter comprising at least one of:

a geographic location of the at least one computing device;

a temporal access interval corresponding with the network access request; or a compliance status indicating an association of the first node with a second node of the protected network, the second node corresponding with a private data of the at least one computing device.

18. The method of claim 12, wherein generating the at least one token comprises:

verifying, by the one or more processors, the network access request based on an authentication event using authentication data of the at least one computing device;

generating, by the one or more processors, a public-private key pair for the first node, the public-private key pair comprising a public key and a private key;

generating, by the one or more processors, a digital signature for the at least one token using the private key; and recording, by the one or more processors, the public key on the ledger.

19. The method of claim 18, wherein verifying the network access request comprises:

identifying, by the one or more processors, at least one authentication factor of the authentication data, the at least one authentication factor comprising at least one of a cryptographic key or identifier of the at least one computing device or biometric authentication data corresponding with a user of the at least one computing device.

20. A non-transitory computer readable medium (CRM) comprising one or more instructions stored thereon that, when executed by one or more processors, cause the one or more processors to perform operations comprising:

receiving, from at least one computing device, a network access request comprising metadata corresponding with the at least one computing device, the network access request corresponding with accessing a protected network using the at least one computing device;

applying the metadata to a node model to cause the node model to generate a first node;

generating a metadata object comprising the metadata, wherein the metadata object comprises one or more access parameters;

generating a control structure comprising a link to the metadata object;

recording, on a ledger, the control structure;

generating, using the control structure, at least one token comprising a token identifier and corresponding with the metadata object, the at least one token compatible with the control structure restricting outputs or updates of the metadata object;

recording, on the ledger, the token identifier;

receiving, from the at least one computing device, an output or update request comprising the first node and at least one request parameter;

accessing, by interfacing with the control structure on the ledger, the metadata object by retrieving a metadata reference corresponding with the at least one token from the control structure and using the metadata reference to obtain the metadata object from an external storage system;

determining one or more network access rights or restrictions of the at least one computing device on the protected network using at least one of the one or more access parameters and the at least one request parameter; and providing or restricting access of the at least one computing device to one or more functions or resources of the protected network based on the one or more network access rights or restrictions.

* * * * *